(12) United States Patent
Yasuda

(10) Patent No.: US 8,588,622 B2
(45) Date of Patent: Nov. 19, 2013

(54) OPTICAL LIGHT SOURCE CONTROL WITH AUXILIARY CONTROLLER

(75) Inventor: Shiyuuichi Yasuda, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 37 days.

(21) Appl. No.: 13/137,982

(22) Filed: Sep. 22, 2011

(65) Prior Publication Data

US 2012/0020658 A1  Jan. 26, 2012

Related U.S. Application Data

(63) Continuation of application No. PCT/JP2009/056582, filed on Mar. 30, 2009.

(51) Int. Cl.
*H04B 10/00* (2013.01)
(52) U.S. Cl.
USPC .......................................... 398/197; 398/198
(58) Field of Classification Search
USPC .................................. 398/197, 198
See application file for complete search history.

(56) References Cited

U.S. PATENT DOCUMENTS

| | | | |
|---|---|---|---|
| 5,844,928 A | 12/1998 | Shastri et al. | |
| 7,852,550 B2 * | 12/2010 | Okaniwa et al. | 359/341.4 |
| 2002/0118424 A1 * | 8/2002 | Miki et al. | 359/187 |
| 2004/0161248 A1 * | 8/2004 | Stewart et al. | 398/196 |
| 2008/0205460 A1 * | 8/2008 | Okaniwa et al. | 372/29.015 |
| 2009/0116834 A1 * | 5/2009 | Sugawa et al. | 398/6 |
| 2009/0168858 A1 * | 7/2009 | Luo | 375/224 |

FOREIGN PATENT DOCUMENTS

| | | |
|---|---|---|
| EP | 0 793 316 A1 | 9/1997 |
| JP | 9-162811 | 6/1997 |
| JP | 9-321375 | 12/1997 |
| JP | 11-3213 | 1/1999 |
| JP | 2006-197264 | 7/2006 |
| JP | 2007-220977 | 8/2007 |
| JP | 2010-118433 | 5/2010 |
| JP | 2010-130316 | 6/2010 |
| WO | 02/069464 A1 | 9/2002 |

OTHER PUBLICATIONS

Japanese Office Action issued Aug. 7, 2012 in corresponding Japanese Patent Application No. 2011-508118.
International Search Report for PCT/JP2009/056582, mailed Jun. 16, 2009.
Written Opinion of the International Searching Authority for International Application No. PCT/JP2009/056582.

\* cited by examiner

*Primary Examiner* — Nathan Curs
(74) *Attorney, Agent, or Firm* — Staas & Halsey LLP

(57) ABSTRACT

An optical device includes a light source, a controller that supplies control information to the light source and controls an output level of the light source, a monitor that outputs an operation state of the optical output as a monitor output, and an auxiliary controller that records the monitor output and the control information. When the controller stops supplying the control information, the auxiliary controller outputs the control information to the light source in accordance with the relation between the recorded monitor output and the recorded control information.

4 Claims, 21 Drawing Sheets

FIG.4

| TEMPERATURE | CONTROL SIGNAL |
|---|---|
| 0°C | 1000 LSB |
| 1°C | 1020 LSB |
| 2°C | 1040 LSB |
| . | . |
| . | . |
| . | . |
| 35°C | 2500 LSB |
| 37°C | 2550 LSB |
| 39°C | 2600 LSB |
| 40°C | 2650 LSB |
| . | . |
| . | . |
| 68°C | 4900 LSB |
| 69°C | 4950 LSB |
| 70°C | 5000 LSB |

| TIME | CONTROL SIGNAL |
|---|---|
| 0s | 0.0% |
| 1s | 20.0% |
| 2s | 25.0% |
| . | . |
| 6s | 45.5% |
| 7s | 50.0% |
| 8s | 55.0% |
| 9s | 60.0% |
| 10s | 65.0% |
| . | . |
| 58s | 98.5% |
| 59s | 99.5% |
| 60s | 100.0% |

| TEMPERATURE | CONTROL SIGNAL |
|---|---|
| K30°C | 2000 LSB |
| K31°C | 2020 LSB |
| K32°C | 2040 LSB |
| K33°C | 2060 LSB |
| . | . |
| . | . |
| K40°C | 3500 LSB |
| K41°C | 3550 LSB |
| K42°C | 3600 LSB |
| K43°C | 3650 LSB |
| . | . |
| . | . |
| K50°C | 5900 LSB |
| K51°C | 5950 LSB |
| K52°C | 6000 LSB |

FIG.16

| TIME | CONTROL SIGNAL |
|---|---|
| 0s | 0.0% |
| 1s | 10.0% |
| 2s | 15.0% |
| . | . |
| 60s | 30.0% |
| 65s | 40.0% |
| 75s | 50.0% |
| . | . |
| 90s | 98.5% |
| 100s | 99.5% |
| 120s | 100.0% |

OPTICAL LIGHT SOURCE CONTROL WITH AUXILIARY CONTROLLER

CROSS-REFERENCE TO RELATED APPLICATION

This application is a continuation of International Application No. PCT/JP2009/056582, filed on Mar. 30, 2009, the entire contents of which are incorporated herein by reference.

FIELD

The embodiments discussed herein are directed to optical devices.

BACKGROUND

In recent years, optical communication using optical fibers has been widely used in broadband networks. Furthermore, optical transceivers are the devices that have been widely used to connect the optical fibers and various communication devices.

The optical transceivers include optical receivers that convert optical signals passing through the optical fibers to electrical signals and optical transmitters that convert electrical signals to optical signals and output the optical signals to higher level devices. Accordingly, specifications that conform to high-capacity, high-speed data transmissions are desirable and furthermore, reducing the size and manufacturing costs are also desirable.

To meet these demands, the capability and the reliability of the optical devices are enhanced by arranging firmware in the optical devices and rewriting the firmware instead of changing the optical devices themselves or adding any part thereto.

Furthermore, because malfunctioning, such as those caused by bugs, occurs in the firmware of the optical devices after they are shipped, customers are demanded to upgrade the firmware.

There are two types of control for the optical devices. One type of control, as a first control, is the control of the optical output. This needs to be performed because a temperature change or the like occurs in the optical devices and thus the optical output varies.

The other type of control, as a second control, is the control of stepwise increases of the optical output. This needs to be performed because, for example, when a higher level device or the like is started, a sudden optical output from the optical devices may cause an electric current greater than the rated current to pass, resulting in a failure of the optical devices.

To perform the first control and the second control, the optical devices usually perform feedback control with respect to the optical output. The feedback control will be described with reference to the drawings.

FIG. 20 is a schematic diagram illustrating feedback control. First, a monitor 50b obtains an optical output from a light source (for example, an LD) included in a light source 50a.

Then, the monitor 50b monitors the operation state of the optical output and outputs, to a feedback information creating circuit 50c, monitor information indicating the monitored optical output.

Thereafter, in accordance with the monitor information that is input from the monitor 50b, the feedback information creating circuit 50c creates feedback information and outputs the created feedback information to an analog circuit 50d. Hereinafter, the information created by the feedback information creating circuit 50c in this way is referred to as "feedback information".

The analog circuit 50d outputs the feedback information to an analog-to-digital converter (ADC) 50e. Then, the ADC 50e converts the feedback information obtained from the analog circuit 50d from analog information to digital information and outputs it to a firmware circuit 50f.

The firmware circuit 50f includes firmware that defines various specifications of an optical device 50 and obtains the digitized feedback information from the ADC 50e. In the following, the firmware included in the firmware circuit 50f is simply referred to as "firmware".

Then, the firmware circuit 50f creates, from the obtained feedback information, control information for controlling the output level of the light source 50a. In this way, the "control information" indicates information on the control of the optical output and indicates information created from the feedback information by the firmware in the optical device.

Examples of the control information include information, such as 1040 least significant bit (LSB). The LSB indicates the minimum digital circuit; for example, if 1 volt (V) is divided into 1000, 1 millivolt (mV) is 1 LSB.

Then, the firmware circuit 50f outputs the created control information to a digital-to-analog converter (DAC) 50g. The DAC 50g converts the control information obtained from the firmware circuit 50f to analog information and outputs the converted information to the analog circuit 50d.

Thereafter, the analog circuit 50d outputs the information (for example, a control signal) obtained from the DAC 50g to the light source 50a and performs control of the optical output. In this way, the optical device 50 performs feedback control that controls the optical output.

In the following, the control performed by the optical device 50 when firmware is in the process of being upgraded will be described. FIG. 21 is a schematic diagram illustrating control performed by the optical device at the time of an upgrade.

The symbol "t0" illustrated in FIG. 21 indicates the start time of the rising of the optical output and the start time of the feedback control. The symbol "t1" indicates the completion time of the rising of the optical output.

The symbol "t2" indicates the start time of the upgrade of the firmware. The symbol "t3" indicates the completion time of the upgrade of the firmware that was started at "t2".

From "t0" to "t1", the firmware circuit 50f outputs the control information in such a manner that the optical output does not suddenly increase but gradually increase. Then, the firmware circuit 50f outputs the control information that controls the optical output indicated at "t1".

When the upgrade of the firmware is started at "t2", the firmware circuit 50f holds the control information as the control information (for example, 1040 LSB) that is obtained immediately before the upgrade of the firmware.

Then, the firmware circuit 50f stops outputting the control information until the firmware is upgraded and holds the control information of 1040 LSB until "t3", the time at which the upgrade is completed.

The firmware is not upgraded from "t0" to "t2". The operation state of the firmware at the time of not being upgraded is assumed to be in "normal operation".

Thereafter, if the upgrade has been completed, the firmware circuit 50f resumes outputting the control information (1040 LSB) that is held before the starting of the upgrade and the optical device 50 resumes performing the feedback control.

In this way, the optical device 50 stops the feedback control when the upgrade is started and controls to simply hold the control information obtained immediately before the upgrade. Then, after the completion of the upgrade, the optical device 50 resumes the feedback control in accordance with the control information that is held.

As a technology for performing an update process on firmware that is used in an information processing system, a technology is disclosed in which, by arranging a device that stores therein the latest-version firmware and arranging a device that stores therein currently active firmware, if it is determined that, for example, the currently active firmware in the information processing system is different from the latest version firmware, the latest version firmware is downloaded in order to perform an update process on the currently active firmware (for example, Japanese Laid-open Patent Publication No. 11-003213).

However, with the technology described above, the optical device does not perform feedback control during the upgrade of the firmware. Accordingly, there is a problem in that the optical output is not properly controlled.

Such a case will be specifically described with reference to FIGS. 20 and 22. FIG. 22 is a schematic diagram illustrating the state of an optical output at the time of an upgrade.

The symbol "t10" illustrated in FIG. 22 indicates the rising of the optical output and the start time of the feedback control performed by the optical device 50. The symbol "t11" indicates the start time of the upgrade of the firmware that is performed before the rising of the optical output. The symbol "t12" indicates the completion time of the upgrade of the firmware that was started at t11.

The symbol "t13" indicates the completion time of the rising of the optical output that was started at "t10". The symbol "t14" indicates the resumption time of the upgrade of the firmware during normal operation. The symbol "t15" indicates the completion time of the upgrade of the firmware that was started at "t14".

First, at "t11", the optical device 50 temporarily stops the feedback control that controls the optical output, holds the control information obtained immediately before the upgrade of the firmware was started, and resumes control of outputting the optical output at "t12".

Accordingly, from "t11" to "t12", the optical device 50 does not perform the feedback control on the optical output and thus the control of the optical output temporarily stops. The rising of the optical output would be completed before "t13" if the firmware is not upgraded; however, the rising and the completion of the optical output are delayed due to being affected by the upgrade.

In contrast, from "t14" to "t15", if, for example, a temperature change occurs in the optical device 50, the optical output indicated at "t14" differs from that indicated at "t15" due to being affected by the temperature change.

From "t14" to "t15", because the optical device 50 holds the control information obtained at "t14" and temporarily stops the feedback control, the optical device 50 does not have the control information associated with the optical output indicated at "t15".

Accordingly, even when the upgrade is completed and the optical device 50 resumes the feedback control, the optical device 50 does not have the control information associated with the temperature change after the upgrade and thus does not control the optical output in accordance with the temperature change.

SUMMARY

According to an aspect of an embodiment of the invention, an optical device includes an light source, a controller that supplies control information to the light source and controls an output level of the light source, a monitor that outputs an operation state of the optical output as a monitor output, and an auxiliary controller that records the monitor output and the control information, and when the controller stops supplying the control information, the auxiliary controller outputs the control information to the light source in accordance with the relation between the recorded monitor output and the recorded control information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a schematic diagram illustrating an example of the data structure of a temperature-based control table according to the first embodiment;

FIG. 8 is a schematic diagram illustrating an example of the data structure of a time-based control table according to the second embodiment;

FIG. 15 is a schematic diagram illustrating an example of the data structure of a temperature-based control table according to the fourth embodiment;

FIG. 16 is a schematic diagram illustrating an example of the data structure of a time-based control table according to the fourth embodiment;

DESCRIPTION OF EMBODIMENTS

Preferred embodiments of the present invention will be explained with reference to accompanying drawings. The present invention is not limited to the embodiments described below.

For the outline of the optical device according to the embodiments, control of an optical output performed by the optical device in "normal operation", which is described above, will be described first and then the outline of the embodiments will be described.

Figure 1:
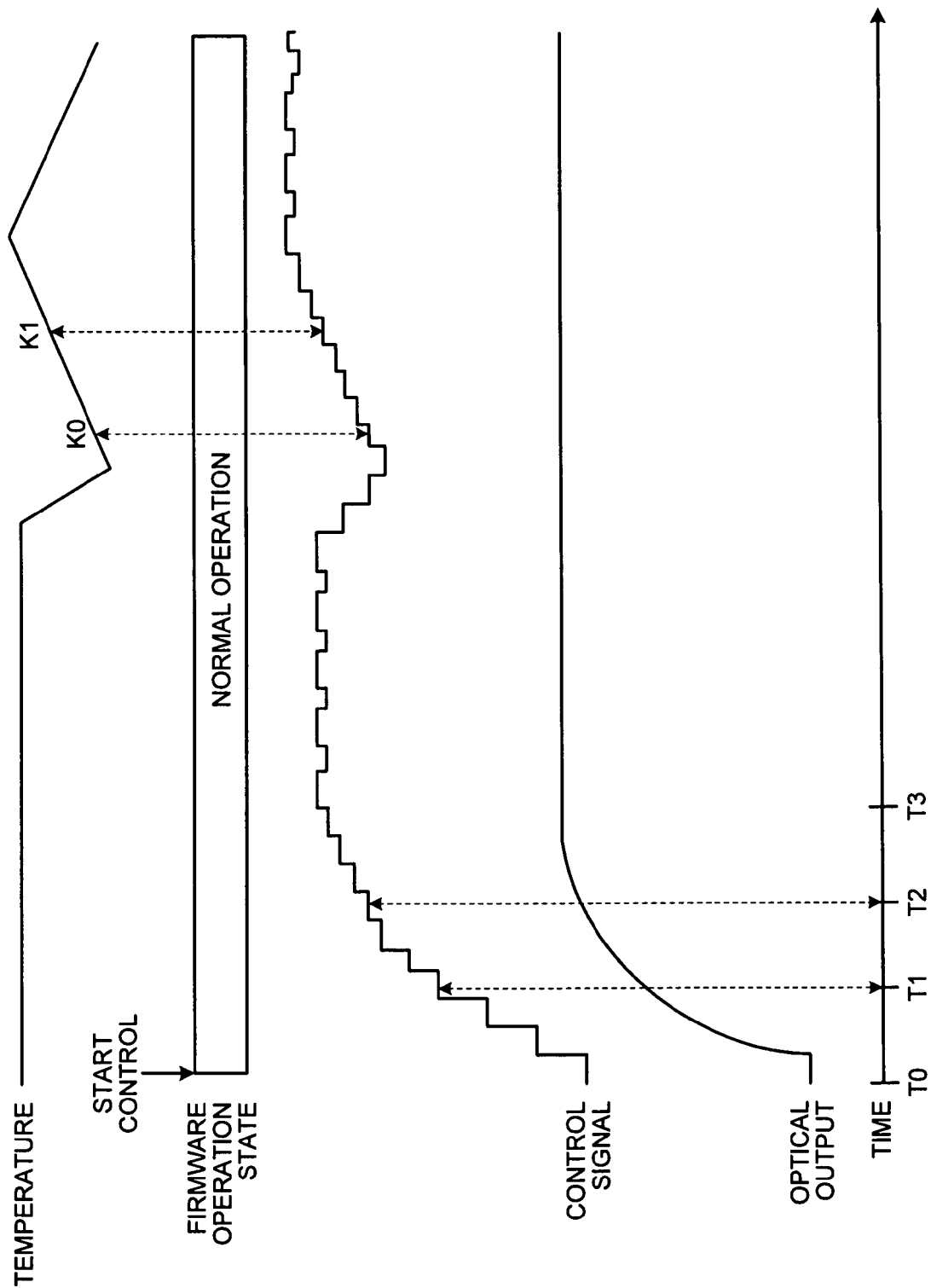
FIG. 1 is a schematic diagram illustrating an optical output obtained in normal operation.

FIG. 1 is a schematic diagram illustrating an optical output obtained in normal operation. In normal operation, firmware of the optical device performs complicated arithmetic processing; however, when an optical output is made to increase in stages, control information is determined for each elapsed time after the start time of the feedback control.

Furthermore, even when the rising of the optical output is completed, the control information is determined, for example, for each temperature in the optical device. This will be specifically described below.

The symbols "T1" and "T2" illustrated in FIG. 1 indicate the elapsed time after the start time "T0" of the feedback control of the optical output. The control information is determined for each elapsed time, e.g., the control information associated with T1 is 300 LSB and the control information associated with T2 is 500 LSB.

Furthermore, even when a temperature change occurs in the optical device after the completion of the rising of the optical output, i.e., after "T3", the control information that is output from the optical device is determined for each temperature in a similar manner as the above. For example, the control information is determined for each temperature; for example, the control information at K0° C. is "600 LSB" and the control information at K1° C. is "650 LSB".

Outline of the Embodiments

The optical device according to the embodiment includes an auxiliary controller that controls, instead of firmware, the optical output while the firmware is being upgraded. In the following, the outline of the operation of the auxiliary controller will be specifically described.

First, the auxiliary controller obtains, in normal operation, both the elapsed time after the starting of the rising of the optical output until the completion thereof and the control information that is output from the firmware, and stores, for each elapsed time, the obtained control information in the auxiliary controller.

If the upgrade of the firmware is started during the rising of the optical output, the auxiliary controller outputs the stored control information as auxiliary control information. The optical output is controlled in accordance with the output auxiliary control information.

Thereafter, the auxiliary controller outputs the auxiliary control information until the completion of the upgrade of the firmware. Accordingly, the optical device allows the optical output to gradually increase and to be completed without suspending the rising of the optical output.

Furthermore, in normal operation, the auxiliary controller obtains both temperature information that indicates the temperature in the optical device and control information that is output from the firmware and stores therein the obtained control information for each piece of temperature information. When the upgrade of the firmware is started, the auxiliary controller outputs the stored control information as auxiliary control information.

Then, the optical output is controlled in accordance with the auxiliary control information that is output from the auxiliary controller. Accordingly, even when the temperature of the optical device changes, the optical output is maintained at a predetermined state.

By arranging, in addition to the firmware, the auxiliary controller in the optical device, even if the upgrade of the firmware is started, the optical device can appropriately control the optical output. This will be specifically described with reference to the drawings.

Figure 2:
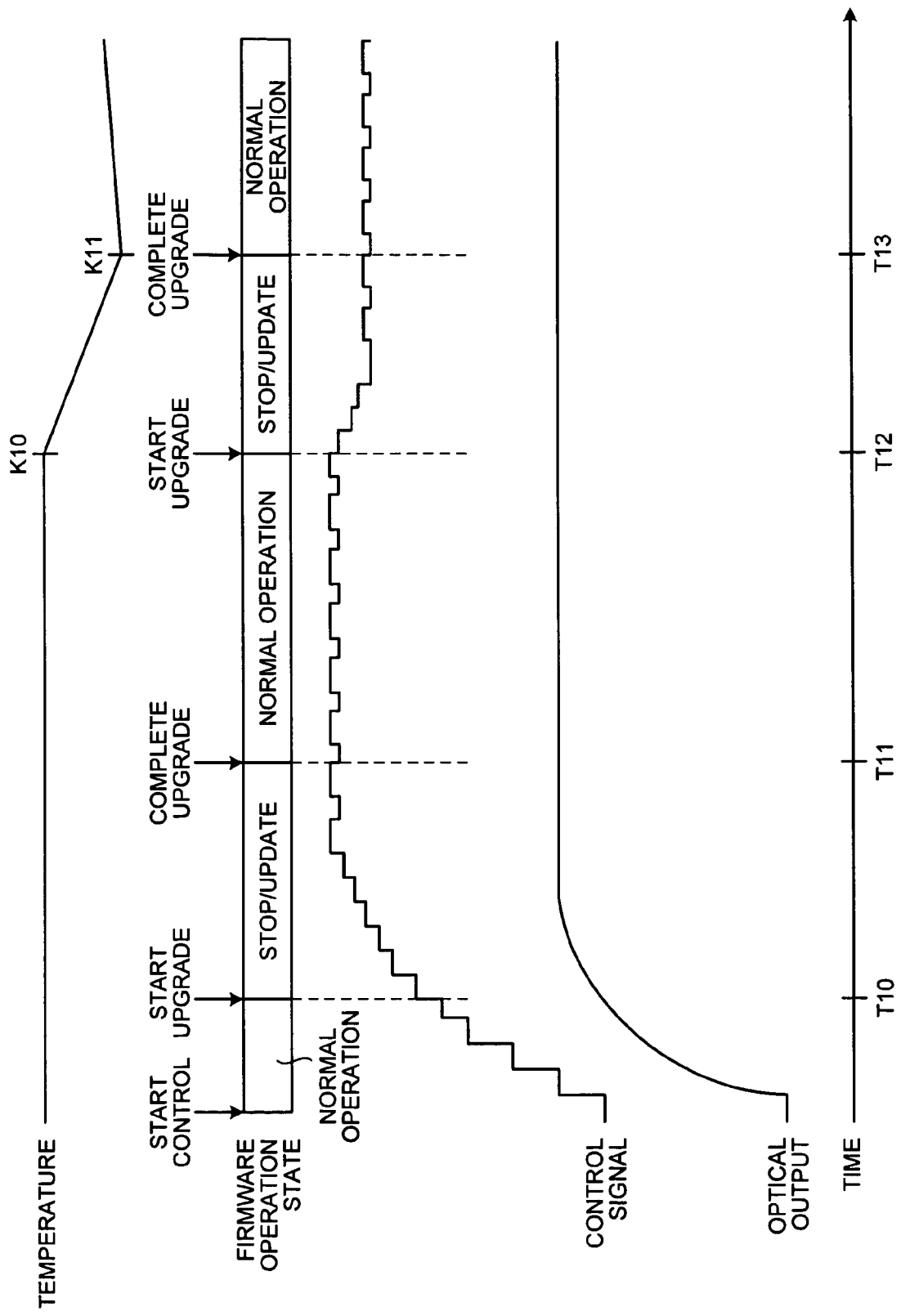
FIG. 2 is a schematic diagram illustrating an advantage of an embodiment.

FIG. 2 is a schematic diagram illustrating an advantage of the embodiments. The symbol "T10" illustrated in FIG. 2 indicates the start time of an upgrade of the firmware during the rising of the optical output. The symbol "T11" indicates the completion time of the upgrade that was started at "T10".

The symbol "T12" indicates the start of an upgrade after "T11". The symbol "T13" indicates the completion time of the upgrade that was started at "T12".

From "T10" to "T11", the firmware in the optical device temporarily stops outputting the control information; however, during this time, the auxiliary controller outputs the auxiliary control information. Accordingly, the optical device gradually increases the optical output without temporarily stopping the feedback control.

From "T12" to "T13", similarly, the firmware of the optical device temporarily stops outputting the control information, however, during this time, the auxiliary controller outputs the auxiliary control information. Accordingly, even when a temperature changes from K10 to K11 during the time from "T12" to "T13", the optical device maintains the optical output indicated at "T11".

As described above, a description will be given with the assumption that the control information output from the auxiliary controller during the upgrade of the firmware is auxiliary control information and that a control signal created from the auxiliary control information is a control auxiliary signal.

Figure 3:
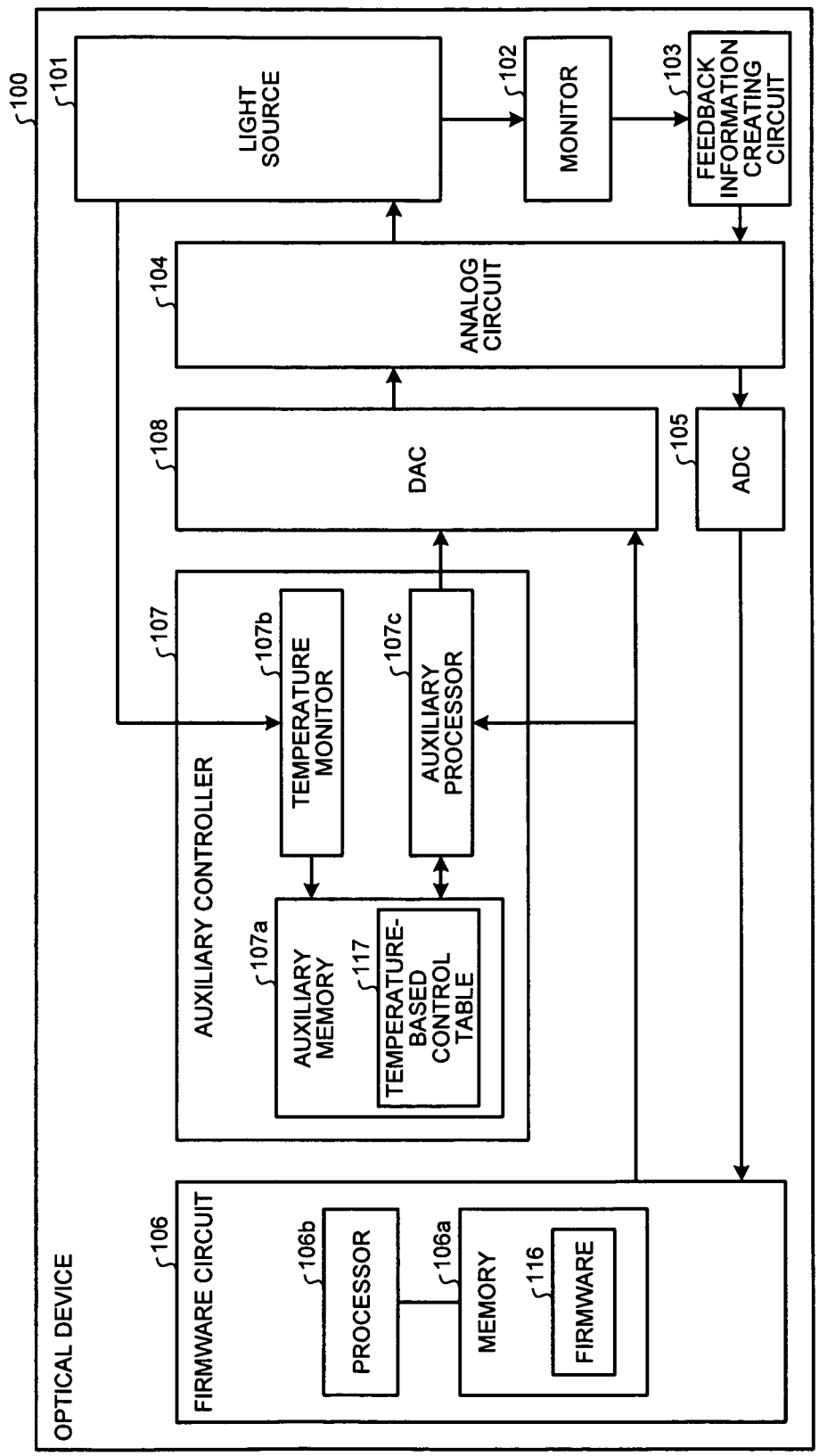
FIG. 3 is a schematic diagram illustrating an optical device according to a first embodiment.

In the following, the optical device according to a first embodiment will be described. FIG. 3 is a schematic diagram illustrating an optical device according to a first embodiment. An optical device 100 illustrated in FIG. 3 maintains an optical output regardless of any temperature change of the optical device by performing output control of the optical device during the upgrade of the firmware.

The optical device 100 includes an light source 101, a monitor 102, a feedback information creating circuit 103, an analog circuit 104, an analog-to-digital converter (ADC) 105, a firmware circuit 106, an auxiliary controller 107, and a digital-to-analog converter (DAC) 108.

The light source 101 indicates a light source in the optical device 100. The light source 101 includes an optical element (for example, an LD) from which information is obtained by the monitor 102.

The monitor 102 monitors the operation state of the light source 101, obtains monitor information indicating an output of the monitor, and outputs the obtained monitor information to the feedback information creating circuit 103.

The feedback information creating circuit 103 creates feedback information in accordance with the monitor information that is input from the monitor 102. Hereinafter, the information created by the feedback information creating circuit 103 is referred to as the "feedback information".

The analog circuit 104 receives the feedback information that is output from the feedback information creating circuit 103 and outputs it to the ADC 105. Furthermore, the analog circuit 104 outputs, to the light source 101, a control signal or a control auxiliary signal received from the DAC 108.

The ADC 105 converts the feedback information created by the feedback information creating circuit 103 from analog information to digital information and outputs the feedback information converted to the digital information to the firmware circuit 106.

The firmware circuit 106 stores therein various specifications of the optical device 100, creates control information from the received feedback information, and outputs the control information. The firmware circuit 106 includes a memory 106a and a processor 106b.

The memory 106a is a memory that stores therein firmware of the optical device 100 and includes firmware 116. The firmware 116 stores therein various specifications, such as the data volume or the data transmission rate transmitted by the optical device 100, and various kinds of information that is used when the control information is obtained from the feedback information.

Rewriting of the firmware 116 is performed by a customer by upgrading it. The firmware circuit 106 stops creating and outputting the control information from the start of the upgrade until the completion thereof.

The processor 106b defines, from the firmware 116, various specifications of the optical device 100; creates, at the time of the normal operation, the control information from the feedback information; and outputs the created control information to the DAC 108.

When the upgrade of the firmware 116 is started, the processor 106b temporarily stops outputting the control information to the DAC 108 until the upgrade is completed and outputs start information on the upgrade of the firmware 116 to the auxiliary controller 107.

Then, when the upgrade of the firmware 116 is completed, the processor 106b outputs, to the auxiliary controller 107, information indicating the completion of the upgrade.

In the following, a description will be given with the assumption that the start information on the upgrade of the firmware 116 is "upgrade start information" and that the completion information on the upgrade of the firmware 116 is "upgrade completion information".

In normal operation, the auxiliary controller 107 obtains temperature information indicating the temperature in the optical device 100 and stores therein control information associated with the obtained temperature information. Furthermore, the auxiliary controller 107 outputs, as auxiliary control information, the control information stored therein from the start until the completion of the upgrade of the firmware 116.

The auxiliary controller 107 includes an auxiliary memory 107a, a temperature monitor 107b, and an auxiliary processor 107c.

The auxiliary memory 107a stores therein control information associated with the temperature information on the temperature in the optical device 100 and includes a temperature-based control table 117. This temperature-based control table 117 will be described with reference to a drawing.

FIG. 4 is a schematic diagram illustrating an example of the data structure of a temperature-based control table according to the first embodiment. The temperature-based control table 117 illustrated in FIG. 4 is a table that stores therein a "temperature" and "control information".

The "temperature" indicates the temperature information on the temperature in the optical device 100 and is obtained by the temperature monitor 107b. The "control information" is information created by the firmware circuit 106 from the firmware 116.

In the temperature-based control table 117 illustrated in FIG. 4, for example, the control information associated with 0° C. indicates 1000 LSB, the control information associated with 1° C. indicates 1020 LSB, and the control information associated with 2° C. indicates 1040 LSB.

In the "temperature" illustrated in FIG. 4, the control information associated with the temperature range from 0° C. to 70° C. is stored; however it is not limited thereto. For example, it is possible to calculate control information associated with the temperature range from 11° C. to 20° C. in accordance with the control information on the temperature range from 0° C. to 10° C. In such a case, it is not necessary to store the control information associated with all temperatures.

The temperature monitor 107b will be described by referring back to FIG. 3. The temperature monitor 107b obtains the temperature information from the light source 101. The temperature monitor 107b starts obtaining the temperature information at the same time as the optical device 100 starts the feedback control. Then, the temperature monitor 107b outputs the obtained temperature information to the auxiliary memory 107a.

In accordance with the temperature information obtained by the temperature monitor 107b and the control information that is output by the firmware circuit 106 during the normal operation, the auxiliary processor 107c stores the control information for each piece of temperature information in the temperature-based control table 117.

Furthermore, the auxiliary processor 107c outputs, as auxiliary control information to the DAC 108, the control information that is obtained from the start of the upgrade of the firmware 116 until the completion thereof and that is stored in the temperature-based control table 117.

Furthermore, when the upgrade start information is input from the processor 106b to the auxiliary controller 107, the auxiliary processor 107c starts outputting the auxiliary control information. Then, when the upgrade completion information is input from the processor 106b to the auxiliary controller 107, the auxiliary processor 107c stops outputting the auxiliary control information.

Figure 5:
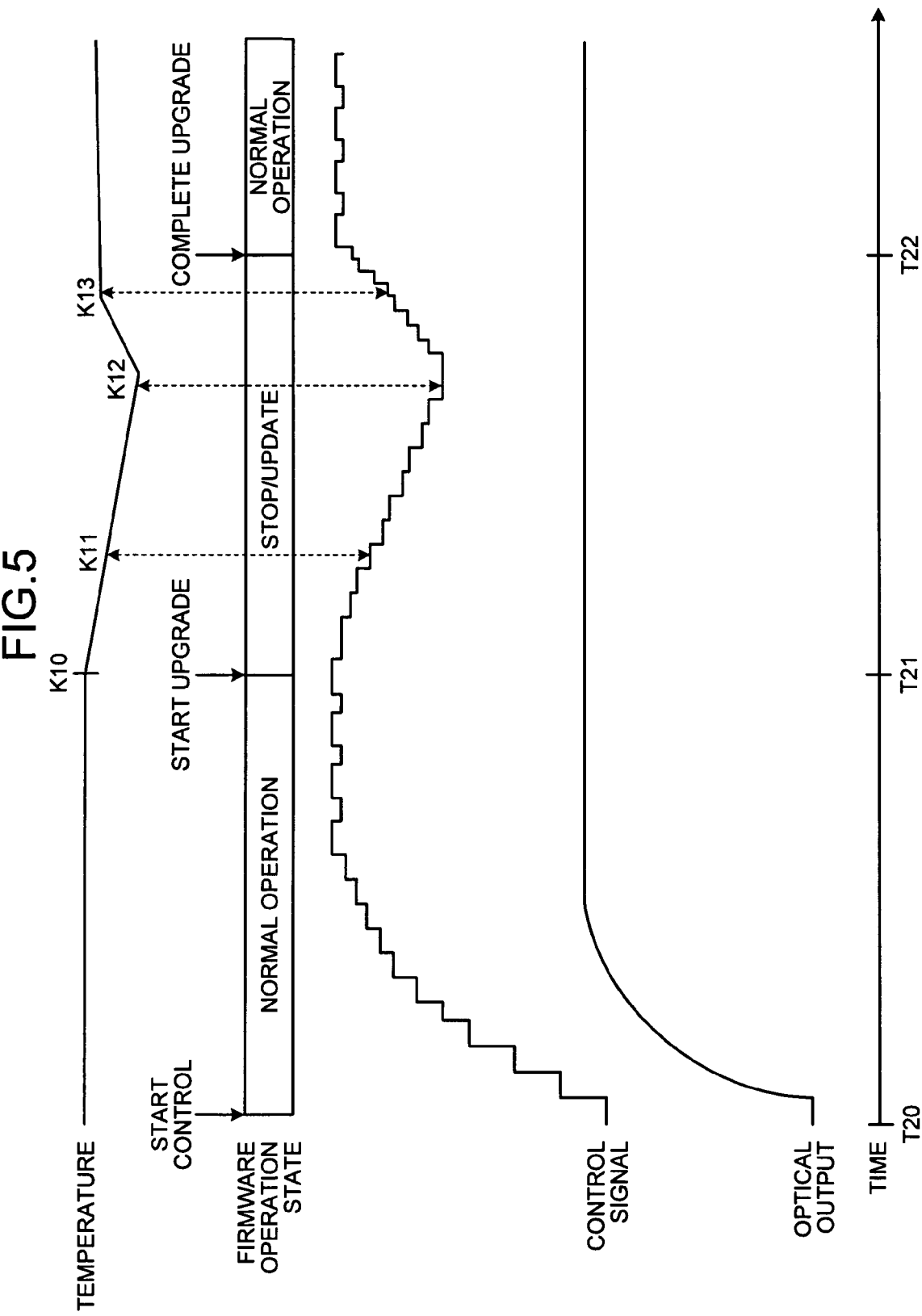
FIG. 5 is a schematic diagram illustrating the operation of an auxiliary controller according to the first embodiment.

In the following, the description given of the operation of the auxiliary controller 107 is based on the description of the temperature monitor 107b, the auxiliary processor 107c, and the like described above. FIG. 5 is a schematic diagram illustrating the operation of the auxiliary controller according to the first embodiment.

The symbol "T20" illustrated in FIG. 5 indicates the start time of the feedback control of the optical output performed by the optical device 100. The symbol "T21" indicates the start time of the upgrade of the firmware 116. The symbol "T22" indicates the completion time of the upgrade that was started at "T21".

A description will be specifically given with the assumption that "K10" is 40° C., "K11" is 37° C., "K12" is 35° C., and "K13" is 39° C.

First, the temperature monitor 107b starts, at "T20", obtaining the temperature information on the temperature in the optical device 100. Then, the temperature monitor 107b outputs the obtained temperature information to the auxiliary memory 107a. The auxiliary processor 107c obtains the control information that is obtained at the start time of "T20" and that is output from the firmware circuit 106.

Then, in accordance with both the temperature information that is input from the temperature monitor 107b and the control information that is output from the firmware circuit 106, the auxiliary processor 107c stores, in the temperature-based control table 117, the control information for each piece of temperature information.

When the upgrade of the firmware 116 is started at "T21", the processor 106b outputs the upgrade start information to the auxiliary controller 107. Then, by referring to the temperature-based control table 117, the auxiliary processor 107c outputs, as the auxiliary control information to the DAC 108, the various kinds of control information stored in the temperature-based control table 117.

For example, if the temperature information is K10, the auxiliary processor 107c outputs the control information associated with 40° C., i.e., 2650 LSB; if the temperature information is K11, it outputs the control information associated with 37° C., i.e., 2550 LSB; and if the temperature information is K12, it outputs the control information associated with 35° C., i.e., 2500 LSB.

Accordingly, even when the temperature information changes from K10 to K11, the auxiliary processor 107c outputs, by referring to the temperature-based control table 117, the control information associated with K11 [37° C], i.e., 2550 LSB; and even when the temperature information changes from K12 to K13, the auxiliary processor 107c outputs the control information associated with K13 [39° C], i.e., 2600 LSB.

If the upgrade of the firmware 116 is completed at "T22", the processor 106b notifies the auxiliary processor 107c of the upgrade completion information. Then, the auxiliary processor 107c stops outputting the auxiliary control information.

As described above, from "T21" to "T22", even though a temperature change occurs in the optical device 100, the optical device 100 controls the optical output and maintains the output state in the state in which the rising of the optical output was completed.

In the following, the DAC 108 will be described by referring back to FIG. 3. The DAC 108 obtains the control information from the firmware circuit 106 during the normal operation, converts the obtained control information to a control signal, and outputs it to the analog circuit 104.

Furthermore, when the firmware 116 is in the process of being upgraded, the DAC 108 creates, from the auxiliary control information received from the auxiliary controller 107, a control auxiliary signal and outputs it to the analog circuit 104.

Figure 6:
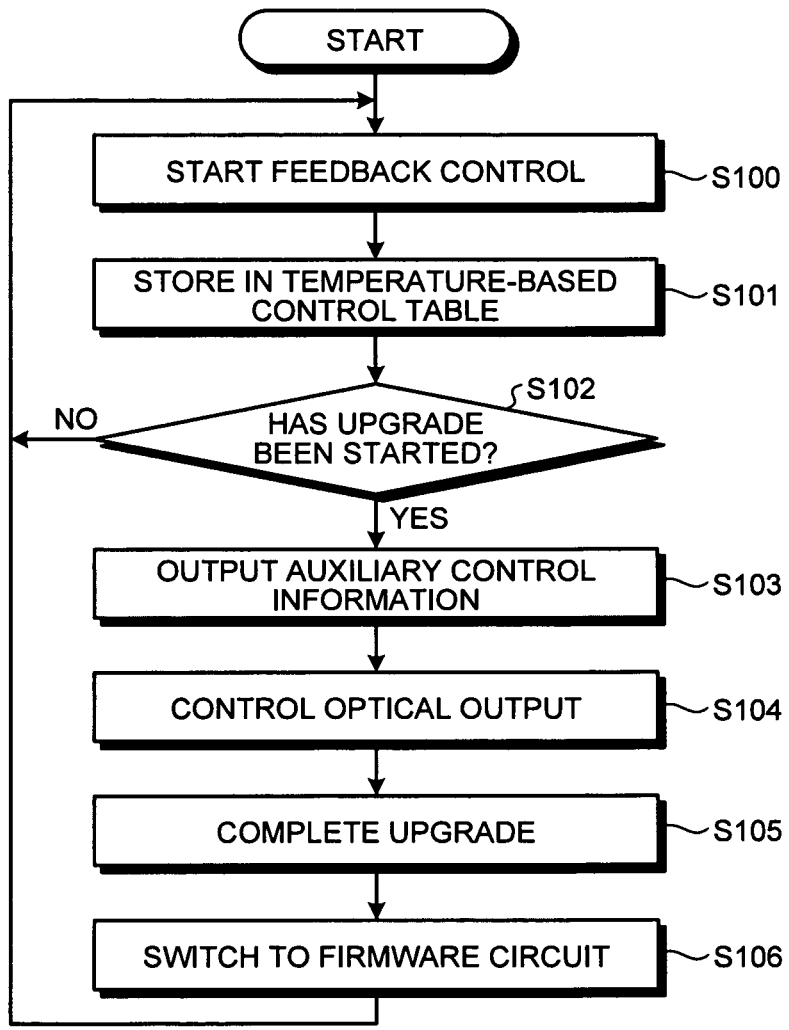
FIG. 6 is a flowchart illustrating the flow of a process performed by the optical device according to the first embodiment.

In the following, the flow of a process performed by the optical device 100 will be described. FIG. 6 is a flowchart illustrating the flow of a process performed by the optical device according to the first embodiment.

First, the optical device 100 starts the feedback control (Operation S100). Then, the temperature monitor 107b starts obtaining the temperature information from the light source 101 and outputs the obtained temperature information to the temperature-based control table 117.

In accordance with the temperature information obtained by the temperature monitor 107b and the control information that is output by the firmware circuit 106 during the normal operation, the auxiliary processor 107c stores, in the temperature-based control table 117, the control information for each piece of temperature information (Operation S101).

When the upgrade of the firmware 116 has been started (Yes at Operation S102), the auxiliary processor 107c starts outputting the auxiliary control information (Operation S103).

At this time, the auxiliary processor 107c refers to the temperature-based control table 117 and outputs the stored control information as the auxiliary control information. Then, in accordance with the output auxiliary control information, the optical output is controlled (Operation S104).

In contrast, when the upgrade has not been started (No at Operation S102), the process proceeds to Operation S100.

Thereafter, when the upgrade of the firmware 116 is completed (Operation S105), the firmware circuit 106 resumes outputting the control information (Operation S106) and the process proceeds to Operation S100.

According to the flowchart, even when a temperature change occurs in the optical device 100 during the upgrade of the firmware 116, the auxiliary controller 107 outputs the auxiliary control information; therefore, the optical device can maintain the optical output.

Figure 7:
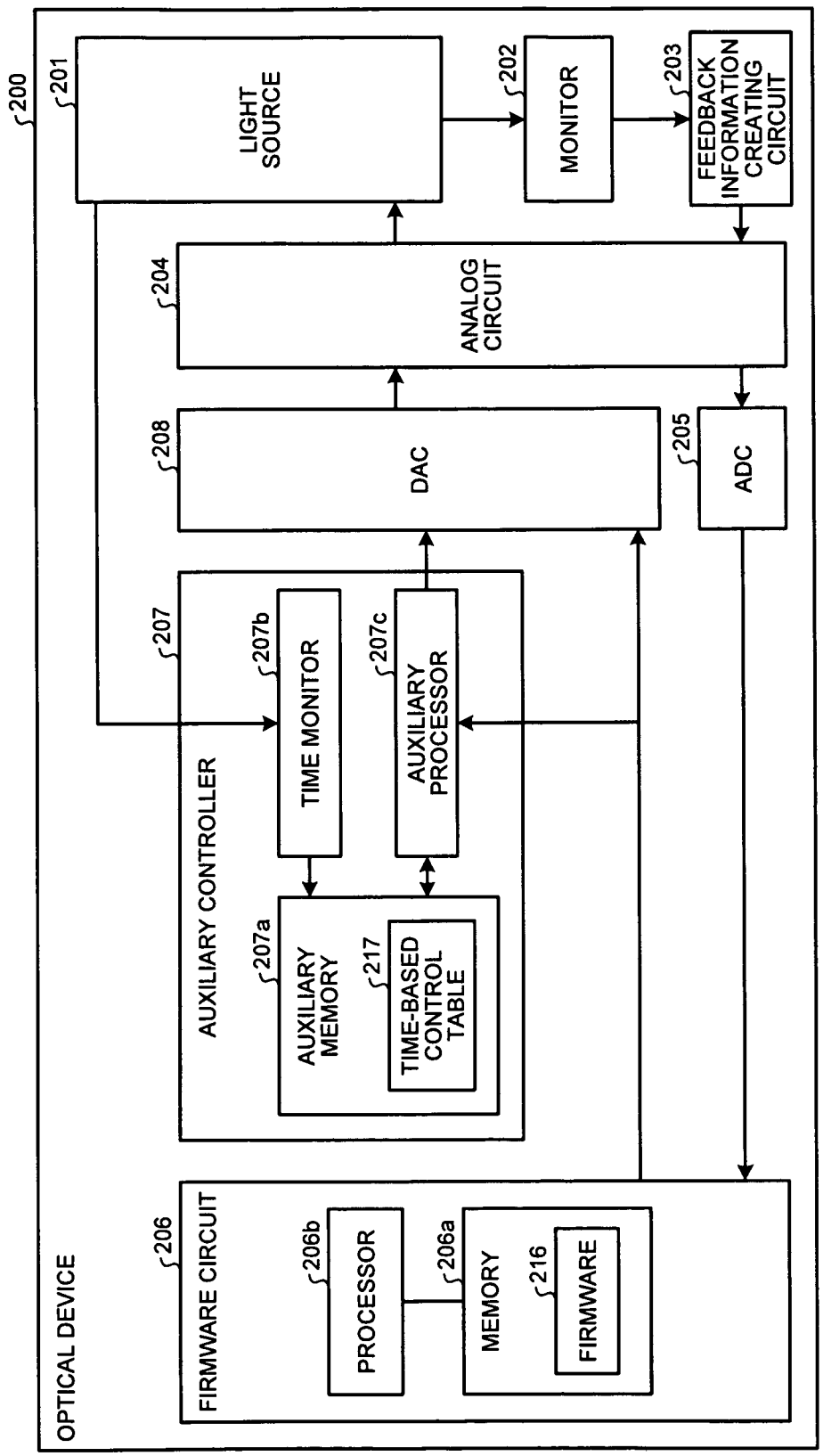
FIG. 7 is a schematic diagram illustrating an optical device according to a second embodiment.

In the following, an optical device according to a second embodiment will be described. FIG. 7 is a schematic diagram illustrating an optical device according to the second embodiment. An optical device 200 illustrated in FIG. 7 maintains the rising of the optical output without suspending the control of the optical output even when the upgrade of the firmware is started before the completion of the rising of the optical output.

The optical device 200 includes a light source 201, a monitor 202, a feedback information creating circuit 203, an analog circuit 204, an analog-to-digital converter (ADC) 205, a firmware circuit 206, an auxiliary controller 207, and a digital-to-analog converter (DAC) 208.

The light source 201 indicates a light source in the optical device 200. Furthermore, the light source 201 includes an optical element (for example, an LD) from which information is obtained by the monitor 202.

The monitor 202 monitors the operation state of the light source 201, obtains the monitor information indicating the output of the monitor, and outputs the obtained monitor information to the feedback information creating circuit 203.

The feedback information creating circuit 203 creates feedback information in accordance with the monitor information received from the monitor 202. Then, the feedback information creating circuit 203 outputs the created feedback information to the analog circuit 204.

The analog circuit 204 receives the feedback information that is output from the feedback information creating circuit 203 and outputs it to the ADC 205. Furthermore, the analog circuit 204 outputs, to the light source 201, a control signal or a control auxiliary signal received from the DAC 208.

The ADC 205 converts the feedback information created by the feedback information creating circuit 203 from analog information to digital information and outputs the feedback information converted to the digital information to the firmware circuit 206.

The firmware circuit 206 stores therein various specifications of the optical device 200, creates the control information from the feedback information, and outputs the control information. The firmware circuit 206 includes a memory 206a and a processor 206b.

The memory 206a is a memory that stores therein firmware of the optical device 200 and includes firmware 216. The firmware 216 stores therein various specifications, such as the data volume or the data transmission rate transmitted by the optical device 200, and various kinds of information that is used when the control information is obtained from the feedback information.

Rewriting of the firmware 216 is performed by a customer by upgrading it. The firmware circuit 206 stops creating and outputting the control information from the start until the completion of the upgrade.

The processor 206b defines, from the firmware 216, various specifications of the optical device 200; creates, at the time of the normal operation, the control information from the feedback information; and outputs the created control information to the DAC 208.

When the upgrade of the firmware 216 is started, the processor 206b temporarily stops outputting the control information to the DAC 208 until the upgrade is completed and outputs start information of the upgrade of the firmware 216 to the auxiliary controller 207.

In the following, a description will be given with the assumption that the start information on the upgrade of the firmware 216 is "upgrade start information" and that the completion information on the upgrade of the firmware 216 is "upgrade completion information".

The auxiliary controller 207 obtains both time information indicating the elapsed time from the start of the feedback control of the optical device 200 until the completion of the rising of the optical output and the control information that is output by the firmware circuit 206 and stores therein the obtained control information for each piece of time information.

Furthermore, if the upgrade of the firmware 216 is started when the optical output is being gradually made to increase, the auxiliary controller 207 outputs the stored control information as auxiliary control information.

The auxiliary controller 207 includes an auxiliary memory 207a, a time monitor 207b, and an auxiliary processor 207c.

The auxiliary memory 207a stores therein the control information for each elapsed time from the start of the feedback control until the completion of the rising of the optical output and includes a time-based control table 217. The time-based control table 217 will be described with reference to a drawing.

FIG. 8 is a schematic diagram illustrating an example of the data structure of a time-based control table according to the second embodiment. The time-based control table 217 illustrated in FIG. 8 is a table that stores therein "time" and "control information".

The "time" is time information [S seconds] indicating the elapsed time since the optical device 200 started the feedback control and is obtained by the time monitor 207b. The "control information" is information created by the firmware circuit 206 from the firmware 216.

As illustrated in FIG. 8, the unit of the "control information" is "%". It is represented by "%" for convenience of description because the optical output required for the optical device 200 differs in accordance with the information included in the firmware 216.

Accordingly, for example, in normal operation, if the control information required for the optical device 200 is 2000 LSB, 100.0% illustrated in FIG. 8 corresponds to 2000 LSB, 20.0% corresponds to 400 LSB, and 50.0% corresponds to 1000 LSB.

In the time-based control table 217 illustrated in FIG. 8, for example, if 100.0% is set to be 2000 LSB, the control information associated with zero seconds indicates 0.0% [0 LSB], the control information associated with 1 second indicates 20.0% [400 LSB], and the control information associated with 2 seconds indicates 25.0% [500 LSB].

Furthermore, as illustrated in FIG. 8, the control information indicates 100% at 60 [sec]. This indicates that it takes 60 [sec] for the completion of the rising of the optical output.

In the following, the time monitor 207b will be described by referring back to FIG. 7. The time monitor 207b obtains the time information. The time monitor 207b starts obtaining the time information at the same time as the optical device 200 starts the feedback control. Then, the time monitor 207b outputs the obtained time information to the auxiliary memory 207a.

In accordance with the time information obtained by the time monitor 207b and the control information associated with the time information, the auxiliary processor 207c stores the control information in the time-based control table 217.

Furthermore, if the upgrade of the firmware 216 is started before the completion of the rising of the optical output, the auxiliary processor 207c outputs, as the auxiliary control information to the DAC 208, the control information that is obtained from the start until the completion of the upgrade and that is stored in the time-based control table 217.

Furthermore, when the upgrade start information is input from the processor 206b to the auxiliary controller 207, the auxiliary processor 207c starts outputting the auxiliary control information. Furthermore, when the upgrade completion information is input from the processor 206b to the auxiliary controller 207, the auxiliary processor 207c stops outputting the auxiliary control information.

Figure 9:
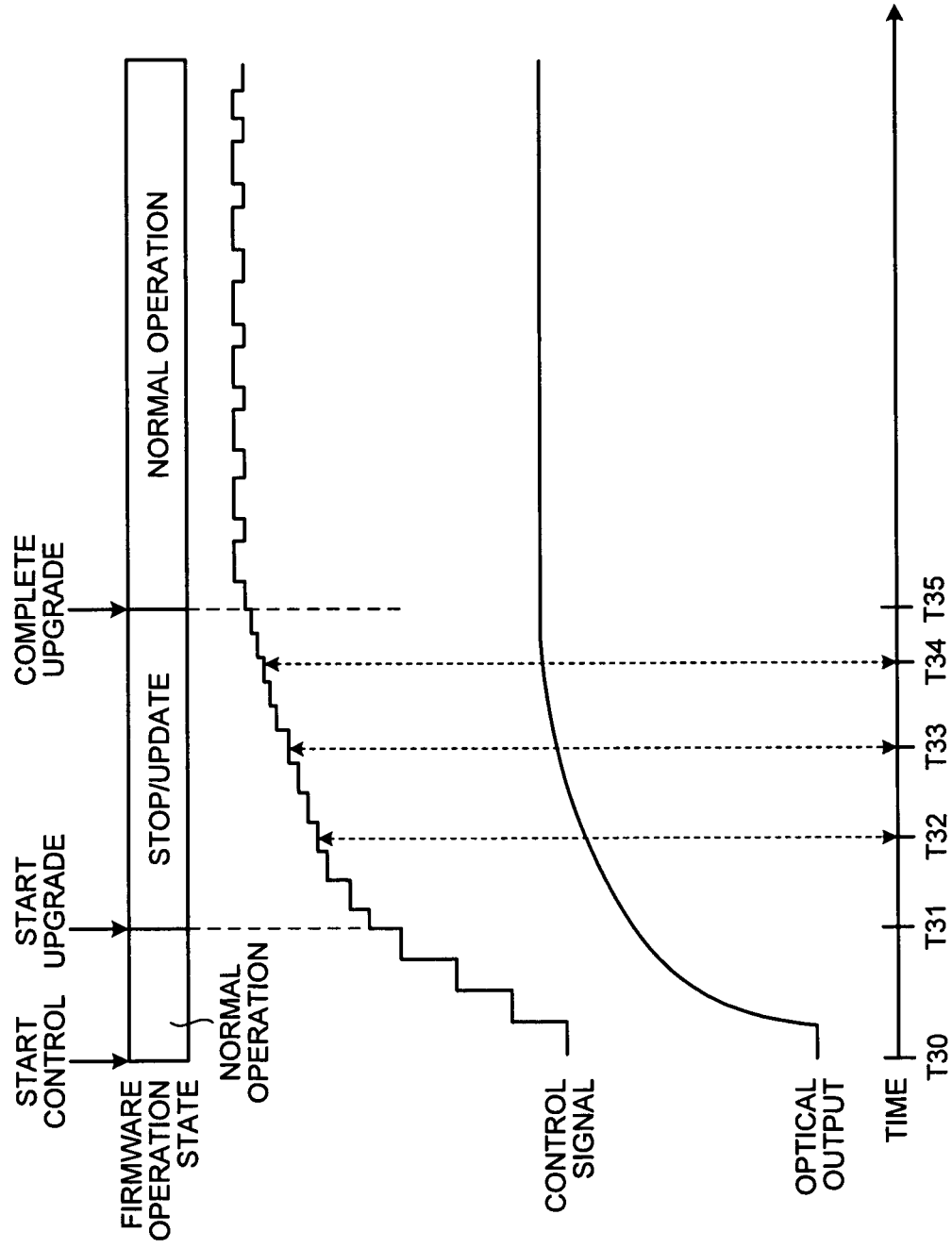
FIG. 9 is a schematic diagram illustrating the operation of an auxiliary controller according to the second embodiment.

In the following, the description given of the operation of the auxiliary controller 207 is based on the description of the time monitor 207b, the auxiliary processor 207c, and the like described above. FIG. 9 is a schematic diagram illustrating the operation of the auxiliary controller according to the second embodiment.

The symbol "T30" illustrated in FIG. 9 indicates the start time of the control of the optical output performed by the optical device 200. The symbol "T31" indicates the start time of the upgrade of the firmware 216. The symbols "T32 to T34" indicate points of time during the period in which the upgrade is being performed. The symbol "T35" indicates the completion time of the upgrade that was started at "T31".

A description will be given with the assumption that the above described symbol "T31" is "6 sec", the symbol "T32" is "7 sec", the symbol "T33" is "8 sec", the symbol "T34" is "9 sec", and the symbol "T35" is "10 sec" and that the control information indicating the state in which the optical output is 100% is 2000 LSB, which has been described above by referring to FIG. 8.

First, the time monitor 207b starts obtaining time information obtained at the start time of "T30". Then, the time monitor 207b outputs the obtained time information to the auxiliary memory 207a. The auxiliary processor 207c obtains the control information that is output by the firmware circuit 206.

Then, in accordance with both the time information that is input from the time monitor 207b and the control information obtained from the firmware circuit 206, the auxiliary processor 207c stores, in the time-based control table 217, the obtained control information for each piece of time information.

Thereafter, when the upgrade of the firmware 216 is started, the processor 206b outputs the upgrade start information and outputs the control information that is obtained at "T31" to the auxiliary controller 207.

Then, in accordance with the control information at "T31", the auxiliary processor 207c outputs, as auxiliary control information, the various kinds of control information that is obtained from "T31" to "T35" and that is stored in the time-based control table 217.

At this time, by referring to the time-based control table 217, the auxiliary processor 207c outputs, to the DAC 208, the control information, i.e., 910 LSB, associated with "T31". Then, the auxiliary processor 207c outputs, to the DAC 208, the control information until "T35", the time at which the upgrade is completed.

For example, the auxiliary processor 207c outputs, at "T32", the control information, i.e., 1000 LSB; outputs, at "T33", the control information, i.e., 1100 LSB; outputs, at "T34", the control information, i.e., 1200 LSB; and outputs, at "T35", the control information, i.e., 1300 LSB.

When the upgrade of the firmware 216 is completed at "T35", the auxiliary processor 207c stops outputting the auxiliary control information. Thereafter, the processor 206b resumes outputting the control information.

As described above, from "T31" to "T35", the optical device 200 outputs the control information in accordance with the elapsed time since "T31". Accordingly, even when the upgrade of the firmware 216 is started before the completion of the rising of the optical output, the optical device 200 gradually raises the optical output without stopping the control of the optical output.

In the following, the DAC 208 will be described by referring back to FIG. 7. The DAC 208 obtains, during the normal operation, the control information from the firmware circuit 206, converts the obtained control information to a control signal, and outputs it to the analog circuit 204.

Furthermore, when the firmware 216 is in the process of being upgraded, the DAC 208 obtains the auxiliary control information from the auxiliary controller 207, converts the obtained auxiliary control information to a control auxiliary signal, and outputs it to the analog circuit 204.

Figure 10:
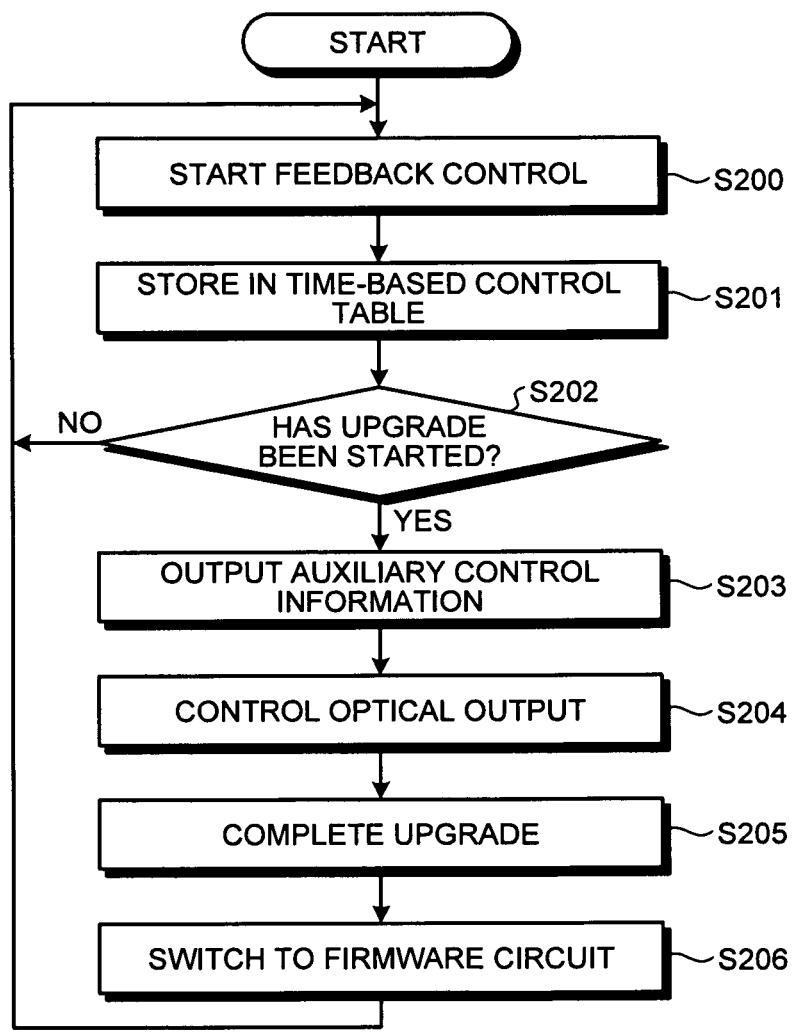
FIG. 10 is a flowchart illustrating the flow of a process performed by the optical device according to the second embodiment.

In the following, the flow of a process performed by the optical device 200 will be described. FIG. 10 is a flowchart illustrating the flow of the process performed by the optical device according to the second embodiment.

First, the optical device 200 starts the feedback control (Operation S200). Then, the time monitor 207b starts obtaining the time information and outputs the obtained time information to the time-based control table 217.

In accordance with the time information obtained by the time monitor 207b and the control information that is output by the firmware circuit 206, the auxiliary processor 207c stores, in the time-based control table 217, the control information for each piece of time information (Operation S201).

When the upgrade of the firmware 216 has been started (Yes at Operation S202), the auxiliary processor 207c starts outputting the auxiliary control information (Operation S203).

At this time, the auxiliary processor 207c refers to the time-based control table 217 and outputs the stored control information as the auxiliary control information. Then, in accordance with the output auxiliary control information, the optical output is controlled (Operation S204).

In contrast, when the upgrade of the firmware 216 has not been started (No at Operation S202), the optical device 200 proceeds to Operation S200.

Thereafter, when the upgrade of the firmware 216 has been completed (Operation S205), the firmware circuit 206 starts outputting the control information (Operation S206) and proceeds to Operation S200.

According to the flowchart, even when the upgrade of the firmware 216 is started before the completion of the rising of the optical output, the auxiliary controller 207 outputs the auxiliary control information; therefore, the rising of the optical output can be performed without stopping it.

Figure 11:
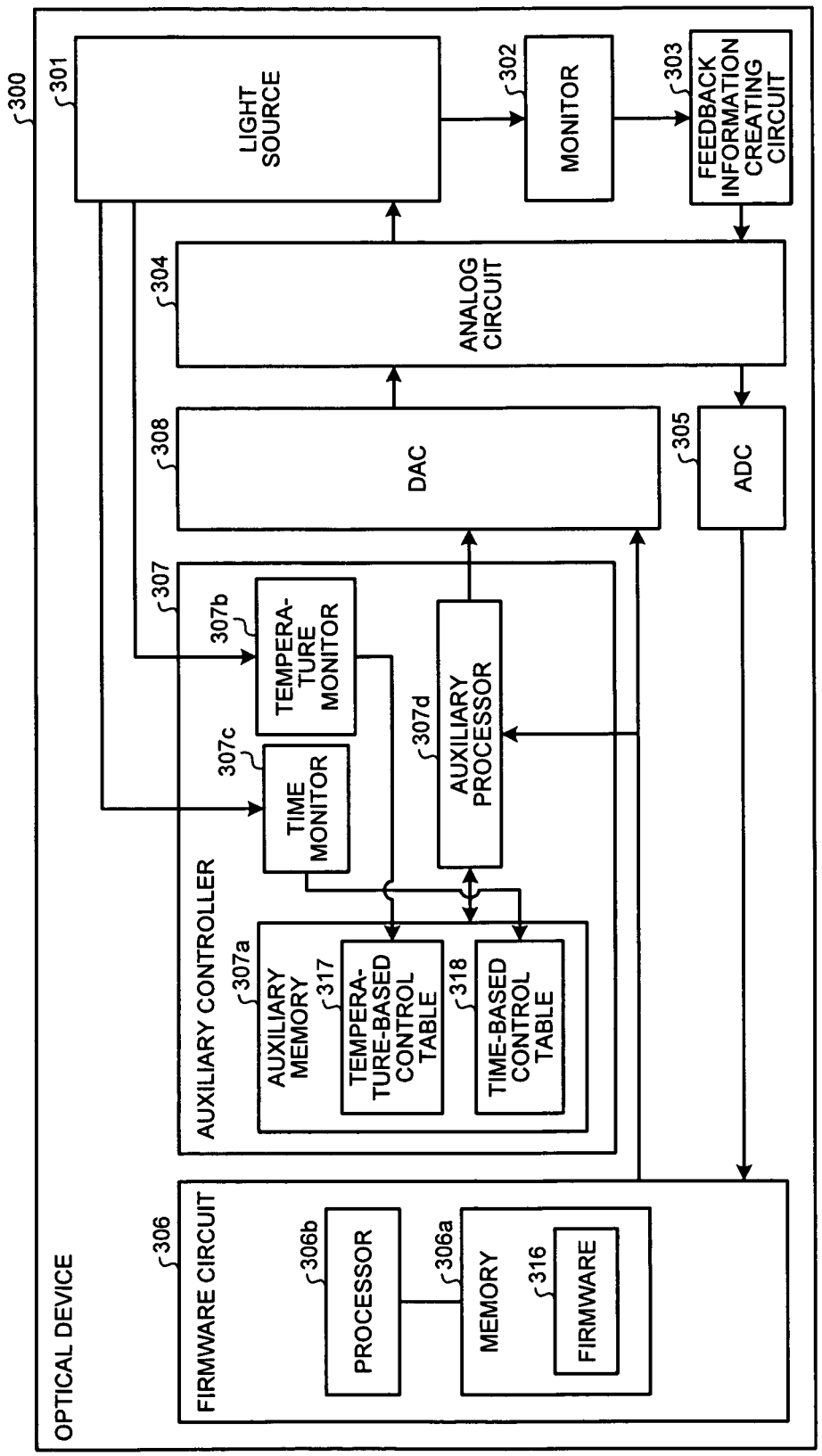
FIG. 11 is a schematic diagram illustrating an optical device according to a third embodiment.

In the following, an optical device according to a third embodiment will be described. FIG. 11 is a schematic diagram illustrating an optical device according to a third embodiment. An optical device 300 illustrated in FIG. 11 includes, in addition to firmware, an auxiliary controller that obtains, when the feedback control is started, both the elapsed time from the start of the rising of the optical output until the completion thereof and the control information that is output from the firmware and that stores, in the auxiliary controller, the obtained control information for each elapsed time.

Furthermore, when the feedback control is started, the auxiliary controller obtains the temperature information indicating the temperature in the optical device and stores therein the control information associated with the temperature information for each piece of temperature information.

Then, if the upgrade of the firmware is started, the auxiliary controller outputs, as the auxiliary control information, the stored control information until the upgrade of the firmware has been completed. Accordingly, the optical device 300 controls the optical output.

The optical device 300 includes a light source 301, a monitor 302, a feedback information creating circuit 303, an analog circuit 304, an analog-to-digital converter (ADC) 305, a firmware circuit 306, an auxiliary controller 307, and a digital-to-analog converter (DAC) 308.

The light source 301 indicates a light source of the optical device 300. Furthermore, the light source 301 includes an optical element (for example, an LD) from which information is obtained by the monitor 302.

The monitor 302 monitors the operation state of the light source 301, obtains the monitor information indicating the output of the monitor, and outputs the obtained monitor information to the feedback information creating circuit 303.

The feedback information creating circuit 303 creates the feedback information in accordance with the monitor information received from the monitor 302. Then, the feedback information creating circuit 303 outputs the created feedback information to the analog circuit 304.

The analog circuit 304 receives the feedback information that is output from the feedback information creating circuit 303 and outputs it to the ADC 305. Furthermore, the analog circuit 304 outputs, to the light source 301, a control signal or a control auxiliary signal received from the DAC 308.

The ADC 305 converts the feedback information created by the feedback information creating circuit 303 from analog information to digital information and outputs the feedback information converted to the digital information to the firmware circuit 306.

The firmware circuit 306 stores therein various specifications of the optical device 300, creates the control information from the feedback information, and outputs the control information. The firmware circuit 306 includes a memory 306a and a processor 306b.

The memory 306a is a memory that stores therein firmware of the optical device 300 and includes firmware 316. The firmware 316 stores therein various specifications, such as the data volume of the data transmission rate transmitted by the optical device 300, and various kinds of information that is used when the control information is obtained from the feedback information.

Rewriting of the firmware 316 is performed by a customer by upgrading it. The firmware circuit 306 stops creating and outputting the control information from the start until the completion of the upgrade.

The processor 306b defines, from the firmware 316, various specifications of the optical device 300; creates, at the time of the normal operation, the control information from the feedback information; and outputs the created control information to the DAC 308.

When the upgrade of the firmware 316 is started, the processor 306b temporarily stops outputting the control information to the DAC 308 until the upgrade is completed and outputs information indicating the start of the upgrade of the firmware 316 to the auxiliary controller 307.

In the following, a description will be given with the assumption that the start information on the upgrade of the firmware 316 is "upgrade start information" and that the completion information of the upgrade of the firmware 316 is "upgrade completion information".

In normal operation, the auxiliary controller 307 obtains the time information indicating the elapsed time after the optical device 300 starts the feedback control and the control information and stores therein the obtained control information for each piece of time information.

If the upgrade of the firmware 316 is started before the completion of the rising of the optical output, the auxiliary controller 307 outputs the stored control information as auxiliary control information.

Furthermore, in normal operation, after the optical device 300 starts the feedback control, the auxiliary controller 307 obtains both the temperature information indicating the temperature in the optical device 300 and the control information and stores therein the obtained control information for each piece of temperature information.

If the upgrade of the firmware 316 is resumed after the completion of the rising of the optical output, the auxiliary controller 307 outputs, as the auxiliary control information, the control information that is stored from the start of the upgrade until the completion thereof.

Furthermore, if the temperature in the optical device 300 changes before the completion of the rising of the optical output, the auxiliary controller 307 outputs the control information using, in combination, both the control information associated with the temperature information and the control information associated with the time information.

The auxiliary controller 307 includes an auxiliary memory 307a, a temperature monitor 307b, a time monitor 307c, and an auxiliary processor 307d.

The auxiliary memory 307a stores therein time information indicating the elapsed time after the feedback control and temperature information on the temperature in the optical device 300. The auxiliary memory 307a includes a temperature-based control table 317 and a time-based control table 318.

It is assumed that the temperature-based control table 317 has the same data structure as that in the temperature-based control table 117 illustrated in FIG. 4 and assumed that the time-based control table 318 has the same data structure as that in the time-based control table 217 illustrated in FIG. 8.

The temperature monitor 307b obtains the temperature information on the temperature in the optical device 300. The temperature monitor 307b starts obtaining the temperature information at the same time as the optical device 300 starts the feedback control. Then, the temperature monitor 307b outputs the obtained temperature information to the temperature-based control table 317.

The time monitor 307c obtains the time information illustrated in FIG. 8. The time monitor 307c obtains the time information indicating the time period from the start of the feedback control until the completion of the rising of the optical output. Then, the time monitor 307c outputs the obtained time information to the time-based control table 318.

The auxiliary processor 307d stores, in the temperature-based control table 317, both the temperature information obtained by the temperature monitor 307b and the control information associated with the temperature information and outputs, to the DAC 308 as the auxiliary control information, the control information that is stored in the temperature-based control table 317 and that is obtained from the start of the upgrade of the firmware 316 until the completion thereof.

Furthermore, the auxiliary processor 307d stores, in the time-based control table 318, the time information obtained by the time monitor 307c and the control information associated with the time information.

Then, when the upgrade of the firmware 316 is started before the completion of the rising of the optical output, the auxiliary processor 307d outputs, to the DAC 308 as the auxiliary control information, the control information that is stored in the time-based control table 318 and that is obtained from the start of the upgrade of the firmware 316 until the completion thereof.

When the upgrade start information is input from the processor 306b to the auxiliary controller 307, the auxiliary processor 307d starts outputting the auxiliary control information. Then, after the upgrade completion information is input from the processor 306b to the auxiliary controller 307, the auxiliary processor 307d stops outputting the auxiliary control information.

Figure 12:
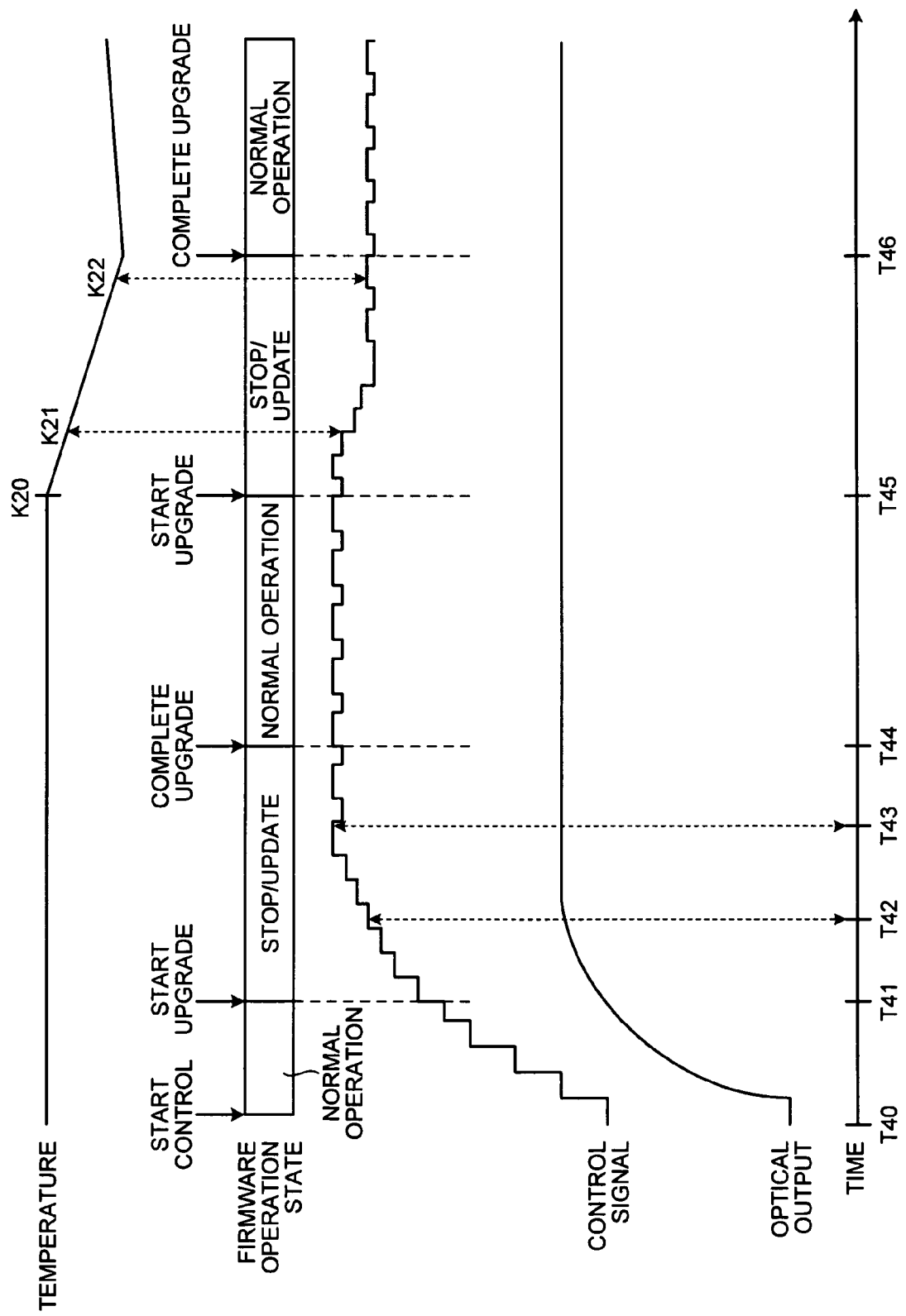
FIG. 12 is a schematic diagram illustrating the operation of an auxiliary controller according to the third embodiment.

In the following, the description given of the operation of the auxiliary controller 307 is based on the description of the temperature monitor 307b, the time monitor 307c, the auxiliary processor 307d, and the like described above. FIG. 12 is a schematic diagram illustrating the operation of the auxiliary controller according to the third embodiment.

The symbol "T40" illustrated in FIG. 12 indicates the start time of the feedback control of the optical output performed by the optical device 300, the symbol "T41" indicates the start time of the upgrade of the firmware 316, the symbols "T42 and T43" indicate points of time during the period in which the upgrade is being performed, and the symbol "T44" indicates the completion time of the upgrade that was started at "T41".

The symbol "T45" indicates the resumption time of the upgrade of the firmware 316. The symbol "T46" indicates the completion time of the upgrade of the firmware 316 that was started at "T45".

A description will be given with the assumption that, as described above using FIG. 8, the control information associated with the state in which the rising of the optical output is completed is 2000 LSB, the symbol "T41" is "6 sec", the symbol "T42" is "7 sec", and the symbol "T43" is "8 sec".

First, the time monitor 307c starts obtaining the time information at the start time of "T40". Then, the time monitor 307c outputs the obtained time information to the time-based control table 318. The auxiliary processor 307d obtains the control information that is output by the firmware circuit 306.

Then, in accordance with both the time information that is input from the time monitor 307c and the control information obtained from the firmware circuit 306, the auxiliary processor 307d stores, in the time-based control table 318, the obtained control information for each piece of time information.

Thereafter, when the upgrade of the firmware 316 is started at "T41", the processor 306b outputs the upgrade start information to the auxiliary processor 307d. Then, the auxiliary processor 307d starts outputting the auxiliary control information.

At this time, the auxiliary processor 307d outputs, to the DAC 308, the control information associated with the time information at "T41", the time at which notification of the upgrade start information is given. Then, the auxiliary processor 307d refers to the time-based control table 318 and outputs the control information as the auxiliary control information until "T44", the time at which the upgrade is completed.

In this case, the auxiliary processor 307d outputs, at "T41", 910 LSB corresponding to 45.5% of 2000 LSB; outputs, at "T42", 1000 LSB corresponding to 50.0% of 2000 LSB; and outputs, at "T43", 1100 LSB corresponding to 55.0% of 2000 LSB.

When the upgrade of the firmware 316 is completed at "T44", the processor 306b notifies the auxiliary processor 307d of the upgrade completion information. At this time, the auxiliary processor 307d outputs, to the processor 306b, the control information obtained at the completion of the upgrade.

At "T44", the auxiliary processor 307d stops outputting the auxiliary control information. Then, the processor 306b resumes outputting the control information.

Accordingly, from "T41" to "T44", the optical device 300 gradually increases the optical output without stopping the output control of the optical output and completes the rising of the optical output without stopping it.

The temperature monitor 307b starts obtaining the temperature information on the temperature in the optical device 300 at "T40" and outputs the obtained temperature information to the temperature-based control table 317. Then, the auxiliary processor 307d obtains the control information that is output by the firmware circuit 306 at the start time of "T40".

In accordance with the temperature information that is input from the temperature monitor 307b and the control information obtained from the firmware circuit 306, the auxiliary processor 307d stores, in the temperature-based control table 317, the obtained control information for each piece of temperature information.

Thereafter, when the upgrade of the firmware 316 is started at "T45", the processor 306b outputs the upgrade start information to the auxiliary controller 307. Then, the auxiliary processor 307d starts outputting the auxiliary control information.

From "T45" to "T46", the auxiliary processor 307d outputs, as the auxiliary control information, various kinds of control information stored in the temperature-based control table 317. For example, if "K20" illustrated in FIG. 12 is "K10" illustrated in FIG. 5, the auxiliary processor 307d outputs the control information, i.e., 2650 LSB, associated with 40° C.

If "K21" is "K11" illustrated in FIG. 5, the auxiliary processor 307d outputs the control information, i.e., 2550 LSB associated with 37° C. Furthermore, if "K22" is "K12" illustrated in FIG. 5, the auxiliary processor 307d outputs the control information, i.e., 2500 LSB, associated with 35° C.

When the upgrade of the firmware 316 is completed at "T46", the processor 306b notifies the auxiliary processor 307d of the upgrade completion information. Then, the auxiliary processor 307d stops outputting the auxiliary control information.

Thereafter, the processor 306b resumes outputting the control information in accordance with the control information received from the auxiliary processor 307d.

As described above, from "T45" to "T46", even though a temperature change has occurred in the optical device 300, the optical device 300 controls the optical output and maintains the output state in the state in which the rising of the optical output was completed.

If the temperature information changes from "T41" to "T44" described above, the auxiliary processor 307d creates the control information using, in combination, the control information associated with the temperature information and the control information associated with the time information.

For example, if the temperature information obtained at "T42" is "K25", the auxiliary processor 307d stores various kinds of control information in the auxiliary memory 307a for each elapsed time from "T42". Furthermore, if a temperature change occurs at "K25", the auxiliary processor 307d stores, in the auxiliary memory 307a, additional control information (for example, +50 LSB) that is added to the various kinds of control information.

Then, in accordance with the elapsed time from "T42" and the additional control information associated with the temperature change from "K25", the auxiliary processor 307d creates the control information and outputs the created control information as the auxiliary control information. This process is performed until the upgrade is completed.

In the following, the DAC 308 will be described by referring back to FIG. 11. The DAC 308 obtains, during the normal operation, the control information from the firmware circuit 306, converts the obtained control information to a control signal, and outputs it to the analog circuit 304.

Furthermore, when the firmware 316 is in the process of being upgraded, the DAC 308 obtains the auxiliary control information from the auxiliary controller 307, converts the obtained auxiliary control information to a control auxiliary signal, and outputs it to the analog circuit 304.

Figure 13:
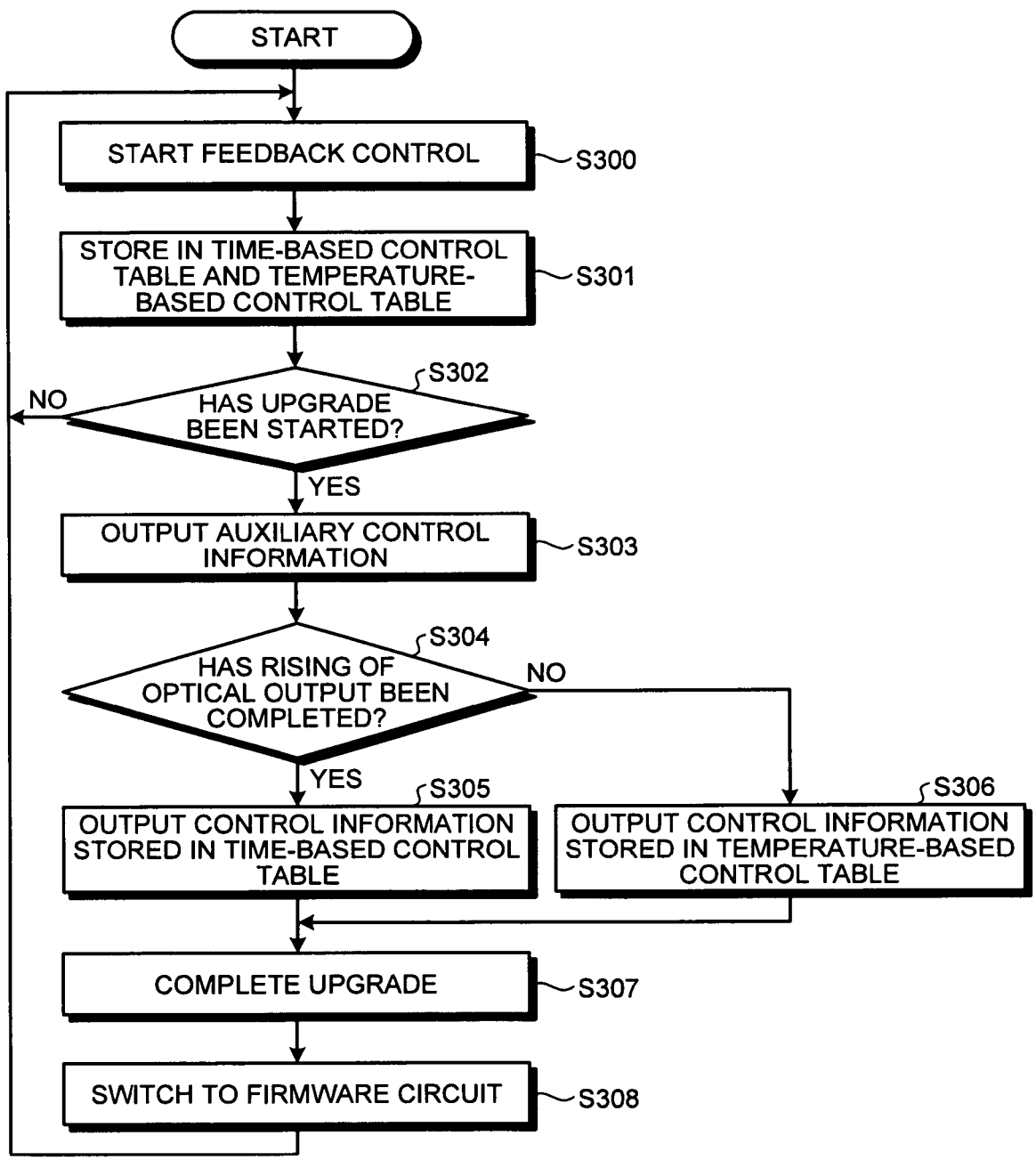
FIG. 13 is a flowchart illustrating the flow of a process performed by the optical device according to the third embodiment.

In the following, the flow of a process performed by the optical device 300 will be described. FIG. 13 is a flowchart illustrating the flow of a process performed by the optical device according to the third embodiment.

First, the optical device 300 starts the feedback control (Operation S300). Then, the auxiliary controller 307 starts obtaining the temperature information and the time information and stores the obtained temperature information and the time information in the temperature-based control table 317 and the time-based control table 318, respectively (Operation S301).

Then, if the upgrade of the firmware 316 has been started (Yes at Operation S302), the auxiliary controller 307 starts outputting the auxiliary control information (Operation S303).

If the optical device 300 is not completed the rising of the optical output (Yes at Operation S304), the auxiliary controller 307 outputs the control information stored in the time-based control table 318 as the auxiliary control information (Operation S305).

Thereafter, if the upgrade of the firmware 316 is completed (Operation S307), the auxiliary controller 307 stops outputting the auxiliary control information. Then, the firmware circuit 306 starts outputting the control information (Operation S308) and the process proceeds to Operation S300.

In contrast, if the upgrade of the firmware 316 has not been started at Operation S302 (No at Operation S302), the process proceeds to Operation S300.

Furthermore, if the rising of the optical output of the optical device 300 is completed (No at Operation S304), the auxiliary controller 307 outputs the control information stored in the temperature-based control table 317 as the auxiliary control information (Operation S306).

Thereafter, if the upgrade of the firmware 316 is completed (Operation S307), the auxiliary controller 307 stops outputting the auxiliary control information. Then, the firmware circuit 306 starts outputting the control information (Operation S308) and the process proceeds to Operation S300.

According to the flowchart, even when the upgrade of the firmware 316 is started before the completion of the rising of the optical output, the auxiliary controller 307 outputs the auxiliary control information; therefore, the optical output can be gradually made to increase.

Furthermore, even when a temperature change occurs in the optical device 300 during the upgrade of the firmware 316, the auxiliary controller 307 outputs the auxiliary control information; therefore, the optical output can be controlled.

Figure 14:
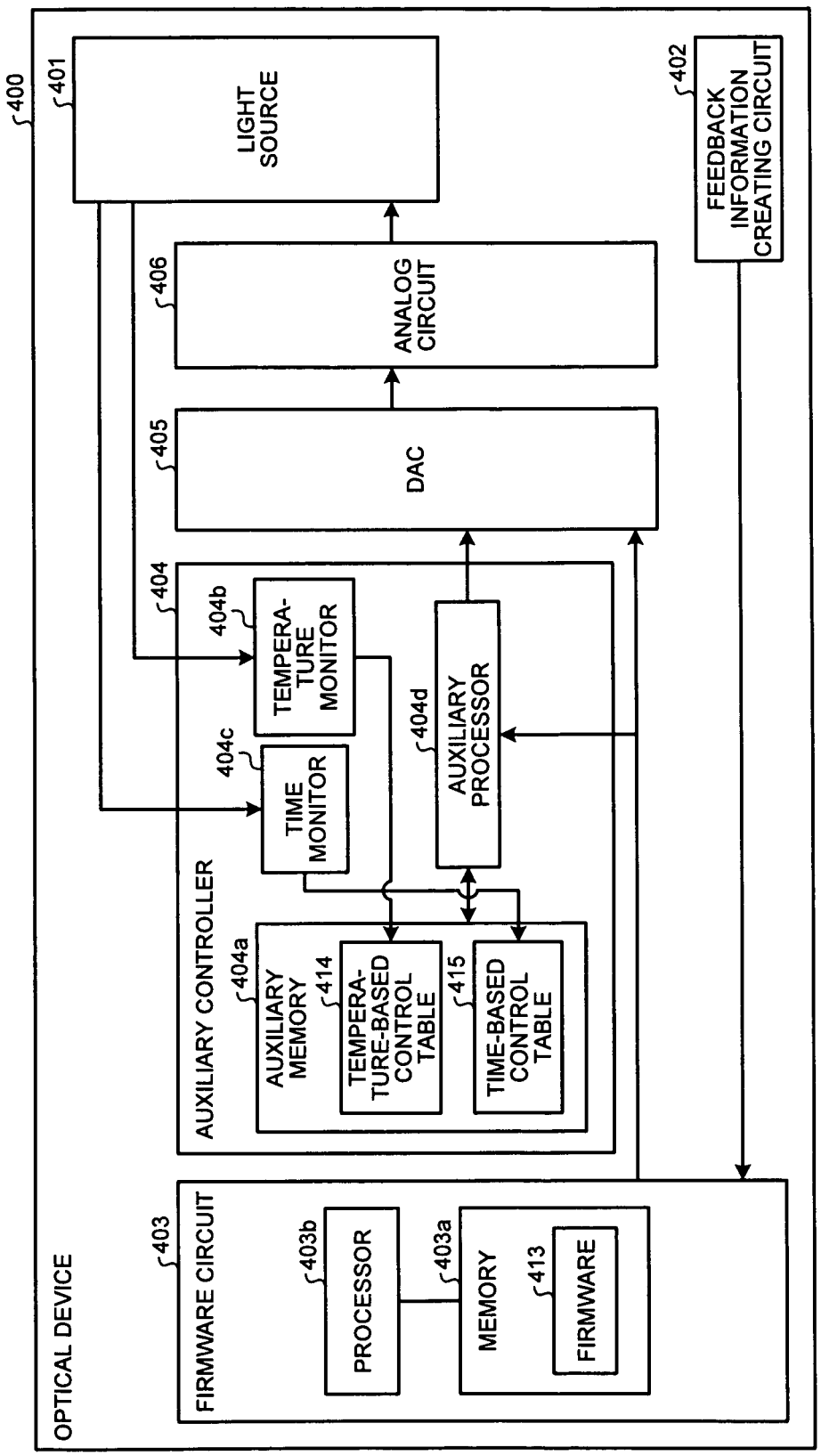
FIG. 14 is a schematic diagram illustrating an optical device according to a fourth embodiment.

In the following, an optical device according to a fourth embodiment will be described. FIG. 14 is a schematic diagram illustrating an optical device according to a fourth embodiment. An optical device 400 illustrated in FIG. 14 obtains feedforward information in accordance with, for example, temperature information on an outside air temperature of the optical device 400 or time information on the time from the start of the startup of the optical device 400.

The feedforward information is temperature information (hereinafter, simply referred to as "outside temperature information") that includes temperature information on the inside temperature of the optical device 400 and temperature information on the outside air temperature of the optical device 400 and is information indicating the state of the optical output associated with the time information that indicates the elapsed time from the start of the startup of the optical device 400.

If the upgrade of the firmware of the optical device 400 is started, instead of the firmware, the optical device 400 controls the optical output in accordance with the feedforward information.

The optical device 400 includes a light source 401, a feedforward information creating circuit 402, a firmware circuit 403, an auxiliary controller 404, a digital-to-analog converter (DAC) 405, and an analog circuit 406.

The light source 401 means a light source of the optical device 400. Furthermore, the light source 401 includes an optical element (for example, an LD).

When the optical device 400 is started, the feedforward information creating circuit 402 obtains, for example, the outside temperature information or the time information indicating the elapsed time from the start of the startup of the optical device 400, creates the feedforward information in accordance with the obtained outside temperature information or the obtained time information, and outputs the created feedforward information to the firmware circuit 403.

The firmware circuit 403 stores therein various specifications of the optical device 400, creates the control information in accordance with the feedforward information that is input from the feedforward information creating circuit 402, and outputs the control information. The firmware circuit 403 includes a memory 403a and a processor 403b.

The memory 403a is a memory that stores therein firmware of the optical device 400 and includes firmware 413. The firmware 413 stores therein various specifications, such as the data volume or the data transmission rate transmitted by the optical device 400, and various kinds of information that is used when the control information is obtained from the feedforward information.

Rewriting of the firmware 413 is performed by a customer by upgrading it. The firmware circuit 403 stops creating and outputting the control information from the start until the completion of the upgrade.

The processor 403b defines, from the firmware 413, various specifications of the optical device 400; creates, at the time of the normal operation, the control information from the feedforward information; and outputs the created control information to the DAC 405.

When the upgrade of the firmware 413 is started, the processor 403b temporarily stops outputting the control information to the DAC 405 until the upgrade is completed and outputs information indicating the start of the upgrade of the firmware 413 to the auxiliary controller 404.

In the following, a description will be given with the assumption that the start information on the upgrade of the firmware 413 is "upgrade start information" and that the completion information of the upgrade of the firmware 413 is "upgrade completion information".

The auxiliary controller 404 obtains time information indicating the elapsed time from, for example, the start of the startup of the optical device 400 and stores therein the control information associated with the obtained time information. If the upgrade of the firmware 413 is started when the optical output is being gradually made to increase, the auxiliary controller 404 outputs the control information as the auxiliary control information.

Furthermore, after the start of the startup of the optical device 400, the auxiliary controller 404 obtains the outside temperature information and the control information that is output by the firmware 413 and stores therein the obtained control information for each piece of outside temperature information.

Then, the auxiliary controller 404 outputs the stored control information as the auxiliary control information during the time period from the start of the upgrade of the firmware 413 until the completion thereof.

The auxiliary controller 404 includes an auxiliary memory 404a, a temperature monitor 404b, a time monitor 404c, and an auxiliary processor 404d.

The auxiliary memory 404a stores therein the control information associated with the elapsed time from the start of the startup of the optical device 400 or stores therein the outside temperature information. The auxiliary memory 404a includes a temperature-based control table 414 and a time-based control table 415.

First, the data structure of the temperature-based control table 414 will be described. FIG. 15 is a schematic diagram illustrating an example of the data structure of a temperature-based control table according to the fourth embodiment. The temperature-based control table 414 illustrated in FIG. 15 is a table that stores therein a "temperature" and "control information". The auxiliary processor 404d manages the input/output of data.

The "temperature" indicates the outside temperature information including both the temperature in the optical device 400 and the outside air temperature of the optical device 400 and is obtained by the temperature monitor 404b, which will be described later. The "control information" is information created by the firmware circuit 403 from the firmware 413.

In the temperature-based control table 414 illustrated in FIG. 15, for example, the control information associated with K30° C. indicates 2000 LSB, the control information associated with K31° C. indicates 2020 LSB, and the control information associated with K32° C. indicates 2040 LSB.

In the following, an example of the data structure of the time-based control table 415 will be described. FIG. 16 is a schematic diagram illustrating an example of the data structure of a time-based control table according to the fourth embodiment. The time-based control table 415 illustrated in FIG. 16 is a table that stores therein "time" and "control information".

The auxiliary processor 404d manages the input/output of the data of various kinds of information stored in the time-based control table 415. The "time" indicates the elapsed time [S seconds] from the start of the startup of the optical device 400 and is obtained by the time monitor 404c.

The "control information", which is the same as that described using FIG. 15, is the information created by the firmware circuit 403 from the firmware 413 and indicates the information that is used when the DAC 405, which will be described later, creates a control signal.

As illustrated in FIG. 16, the unit of the "control information" is "%". It is represented by "%" for convenience of description because the optical output required for the optical device 400 differs in accordance with the information included in the firmware 413.

Accordingly, for example, if the control information associated with the optical output required for the optical device 400 is 3000 LSB, 100.0% illustrated in FIG. 16 corresponds to 3000 LSB, 20.0% corresponds to 600 LSB, and 50.0% corresponds to 1500 LSB.

In the time-based control table 415 illustrated in FIG. 16, for example, if 100.0% is set to be 3000 LSB, the control information associated with zero seconds indicates 0.0% [0 LSB], the control information associated with 1 second indicates 10.0% [300 LSB], and the control information associated with 2 seconds indicates 15.0% [450 LSB].

Furthermore, as illustrated in FIG. 16, the control information indicates 100% at 120 [sec]. This indicates that it takes 120 [sec] for the start of the rising of the optical output until the completion thereof.

In the following, the temperature monitor 404b will be described by referring back to FIG. 14. The temperature monitor 404b obtains the "temperature" illustrated in FIG. 15. The temperature monitor 404b starts obtaining the outside temperature information at the same time as the startup of the optical device 400 is started and outputs the obtained outside temperature information to the temperature-based control table 414.

The time monitor 404c obtains the time information illustrated in FIG. 16. The time monitor 404c starts obtaining the time information at the same time as the optical device 400 starts the startup. Then, the time monitor 404c outputs the obtained time information to the time-based control table 415.

If the upgrade start information is input from the processor 403b to the auxiliary controller 404, the auxiliary processor 404d starts outputting the auxiliary control information. Furthermore, if the upgrade completion information is input from the processor 403b to the auxiliary controller 404, the auxiliary processor 404d stops outputting the auxiliary control information.

Figure 17:
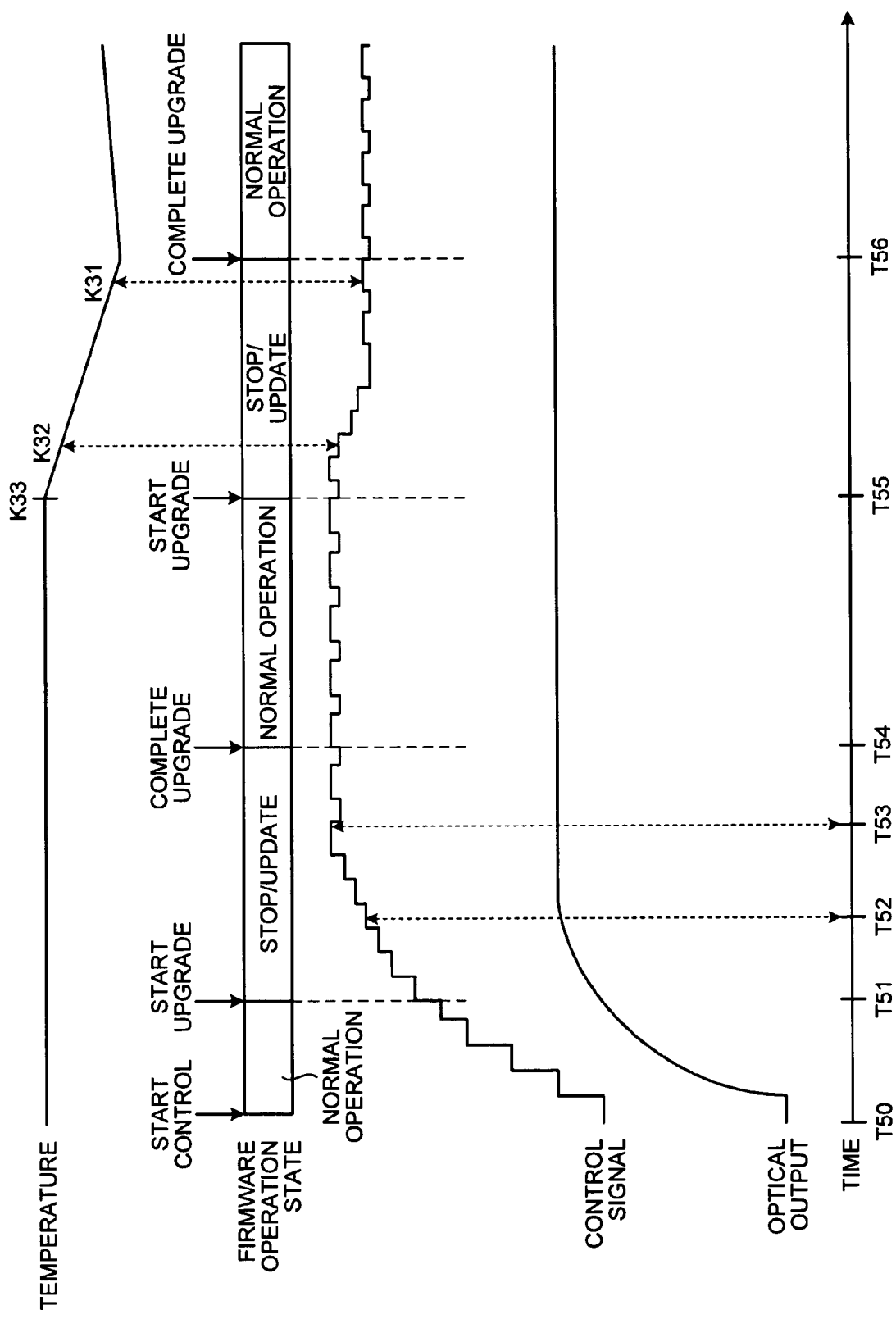
FIG. 17 is a schematic diagram illustrating the operation of an auxiliary controller according to the fourth embodiment.

In the following, the description given of the operation of the auxiliary controller 404 is based on the description of the temperature monitor 404b, the time monitor 404c, the auxiliary processor 404d, and the like described above. FIG. 17 is a schematic diagram illustrating the operation of the auxiliary controller according to the fourth embodiment.

The symbol "T50" illustrated in FIG. 17 indicates the startup time of the optical device 400, the symbol "T51" indicates the start time of the upgrade of the firmware 413, the symbols "T52 and T53" indicate points of time during the period in which the upgrade is being performed, and the symbol "T54" indicates the completion time of the upgrade that was started at "T51".

The symbol "T55" indicates the resumption time of the upgrade of the firmware 413. The symbol "T56" indicates the completion time of the upgrade that was started at "T55".

First, the time monitor 404c starts obtaining the time information at the start time of "T50". Then, the time monitor 404c outputs the obtained time information to the auxiliary memory 404a. The auxiliary processor 404d obtains the control information that is output by the firmware circuit 403.

Then, in accordance with both the time information that is input from the time monitor 404c and the control information obtained from the firmware circuit 403, the auxiliary processor 404d stores, in the time-based control table 415, the obtained control information for each piece of time information.

Then, if the upgrade of the firmware 413 is started at "T51", which is the time before the completion of the rising of the optical output, the processor 403b outputs the upgrade start information to the auxiliary processor 404d. Then, the auxiliary processor 404d starts outputting the auxiliary control information.

Then, from "T51" to "T54", the auxiliary processor 404d refers to the time-based control table 415 and outputs, to the DAC 405 as the auxiliary control information, the various kinds of control information associated with each piece of time information.

For example, a description will be given with the assumption that the control information associated with the state in which the rising of the optical output is completed is 3000 LSB, which is described above by referring to FIG. 16, that the symbol "T51" is "1 sec", and that the symbol "T52" is "2 sec".

In such a case, the auxiliary processor 404d outputs, at "T51", 300 LSB corresponding to 10.0% of 3000 LSB and outputs, at "T52", 450 LSB corresponding to 15.0% of 3000 LSB.

If the upgrade of the firmware 413 is completed at "T54", the processor 403b notifies the auxiliary processor 404d of the upgrade completion information. At this time, the auxiliary processor 404d outputs, to the processor 403b, the control information at the completion of the upgrade.

Then, the auxiliary processor 404d stops outputting the auxiliary control information. Thereafter, the processor 403b starts outputting the control information.

Accordingly, from "T51" to "T54", the optical device 400 gradually increase the rising of the optical output without suspending the control of the optical output.

In contrast, the temperature monitor 404b starts, at "T50", obtaining the outside temperature information on the optical device 400 and outputs the obtained outside temperature information to the auxiliary processor 404d. Then, the auxiliary processor 404d obtains the control information at the start time of "T50" that is output by the firmware circuit 403.

Then, in accordance with both the outside temperature information that is input from the temperature monitor 404b and the control information obtained from the firmware circuit 403, the auxiliary processor 404d stores, in the temperature-based control table 414, the obtained control information for each piece of outside temperature information.

Thereafter, if the upgrade of the firmware 413 is started at "T55", the processor 403b outputs the upgrade start information to the auxiliary controller 404. Then, the auxiliary processor 404d starts outputting the auxiliary control information.

At this time, the auxiliary processor 404d outputs, to the DAC 405, the control information associated with outside temperature information, i.e., K33° C., that is indicated when notification of the upgrade start information is received. Then, the auxiliary processor 404d refers to the temperature-based control table 414 and outputs the control information as the auxiliary control information until "T56", which is the completion of the upgrade.

For example, if the outside temperature information illustrated in FIG. 15 is "K33", the auxiliary processor 404d outputs the control information, i.e., 2060 LSB associated with K33. If the outside temperature information is "K31", it outputs the control information, i.e., 2020 LSB associated with K31. If the outside temperature information is "K32", it outputs the control information, i.e., 2040 LSB associated with K32.

When the upgrade of the firmware 413 is completed at "T56", the processor 403b notifies the auxiliary processor 404*d* of the upgrade completion information. Then, the auxiliary processor 404*d* stops outputting the control information. Thereafter, the processor 403*b* starts outputting the control information.

As described above, from "T55" to "T56", although the outside temperature information on the optical device 400 changes, the optical device 400 can control the optical output and maintains the output state in the state in which the rising of the optical output was completed.

In the following, the DAC 405 will be described by referring back to FIG. 14. The DAC 405 obtains, during the normal operation, the control information from the firmware circuit 403, converts the obtained control information to a control signal, and outputs it to the analog circuit 406.

Furthermore, when the firmware 413 is in the process of being upgraded, the DAC 405 obtains the auxiliary control information from the auxiliary controller 404, converts the obtained auxiliary control information to a control auxiliary signal, and outputs it to the analog circuit 406.

Figure 18:
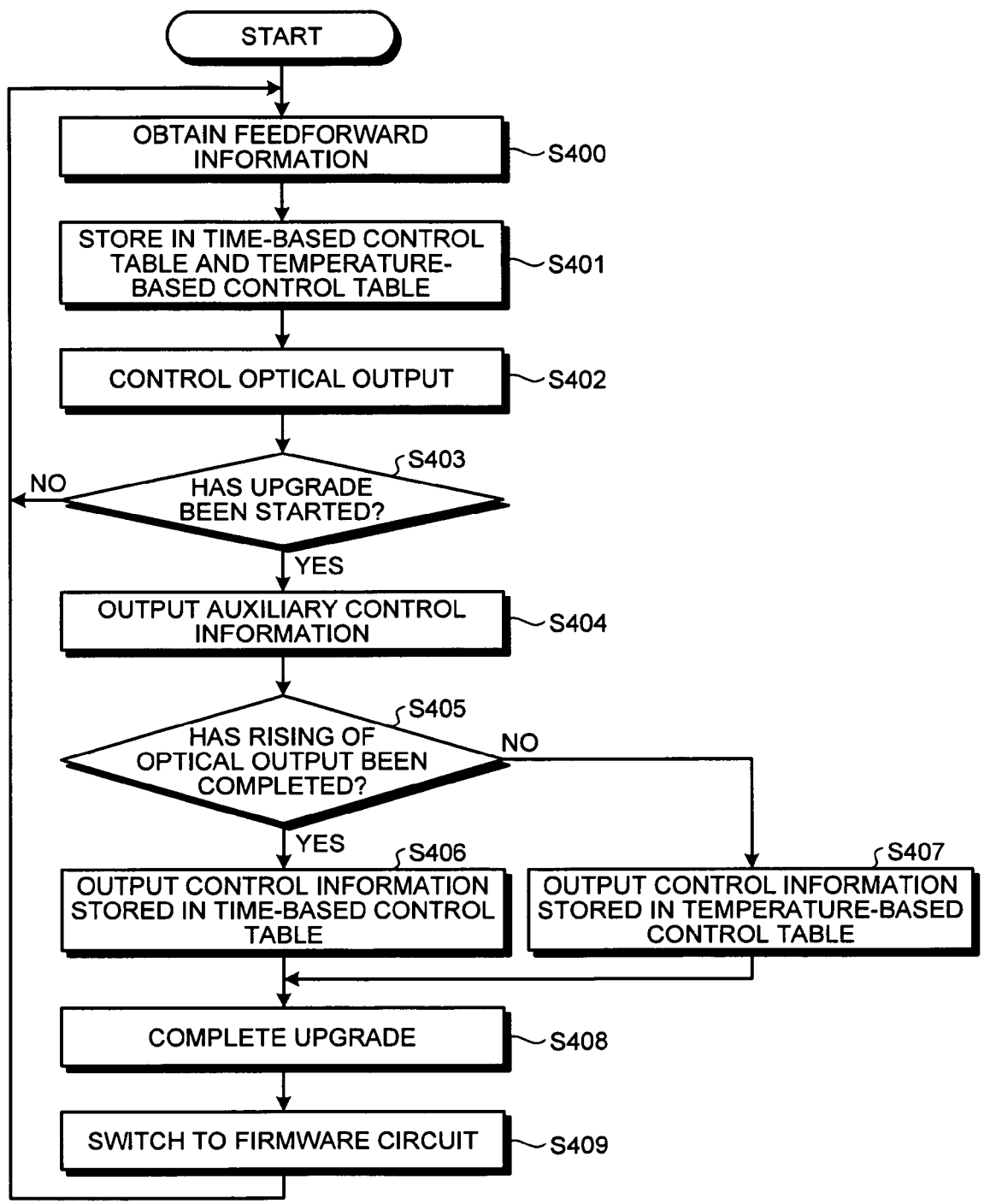
FIG. 18 is a flowchart illustrating the flow of a process performed by the optical device according to the fourth embodiment.

In the following, the flow of a process performed by the optical device 400 will be described. FIG. 18 is a flowchart illustrating the flow of a process performed by the optical device according to the fourth embodiment.

First, the optical device 400 obtains the feedforward information (Operation S400). Then, the auxiliary controller 404 starts obtaining the outside temperature information and the time information and stores each piece of control information associated with the obtained outside temperature information and the time information in the temperature-based control table 414 and the time-based control table 415, respectively (Operation S401).

Then, the firmware circuit 403 controls the optical output (Operation S402). Thereafter, when the upgrade of the firmware 413 has been started (Yes at Operation S403), the auxiliary controller 404 starts outputting the auxiliary control information (Operation S404).

If the rising of the optical output of the optical device 400 is not completed (Yes at Operation S405), the auxiliary controller 404 outputs, as the auxiliary control information, the control information stored in the time-based control table 415 (Operation S406).

Thereafter, when the upgrade of the firmware 413 is completed (Operation S408), the auxiliary controller 404 stops outputting the auxiliary control information (Operation S409) and the process proceeds to Operation S400.

In contrast, if the upgrade of the firmware 413 has not been started at Operation S403 (No at Operation S403) the process proceeds to Operation S400.

If the optical device 400 completes the rising of the optical output (No at Operation S405), the auxiliary controller 404 outputs, as the auxiliary control information, the control information stored in the temperature-based control table 414 (Operation S407).

Thereafter, when the upgrade of the firmware 413 is completed (Operation S408), the auxiliary controller 404 stops outputting the auxiliary control information. Then, the firmware circuit 403 starts outputting the control information (Operation S409) and the process proceeds to Operation S400.

According to the flowchart, even if the upgrade of the firmware 413 is started when the optical output is being made to increase, the auxiliary controller 404 outputs the auxiliary control information; therefore, the optical output can be gradually made to increase.

Furthermore, even if a temperature change occurs in the outside air temperature of the optical device 400 during the upgrade of the firmware 413, the auxiliary controller 404 outputs the auxiliary control information; therefore, the optical output can be maintained.

Incidentally, there is an example of a method of storing firmware in different storage areas so as to avoid suspending control of the optical output when the firmware of the optical device is in a process of being upgraded.

Figure 19:
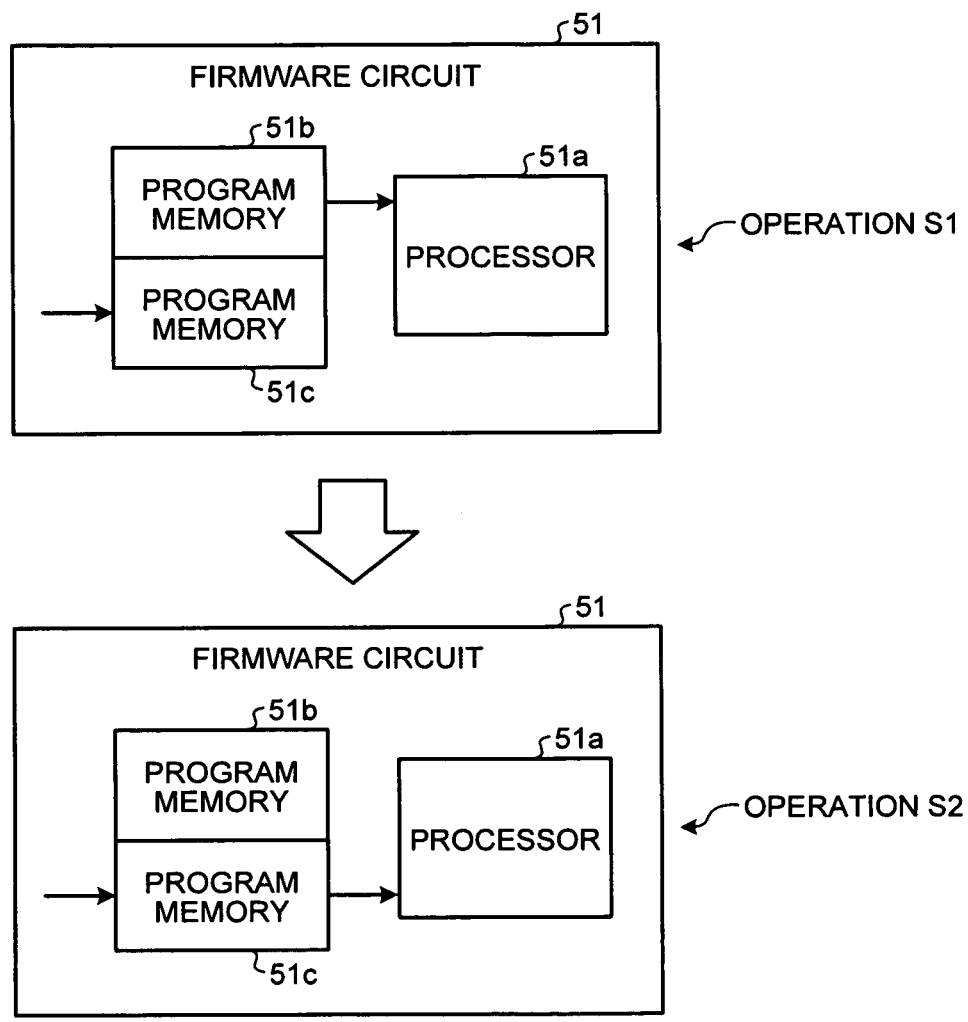
FIG. 19 is a schematic diagram illustrating an example case in which firmware is stored in different storage areas.
Figure 20:
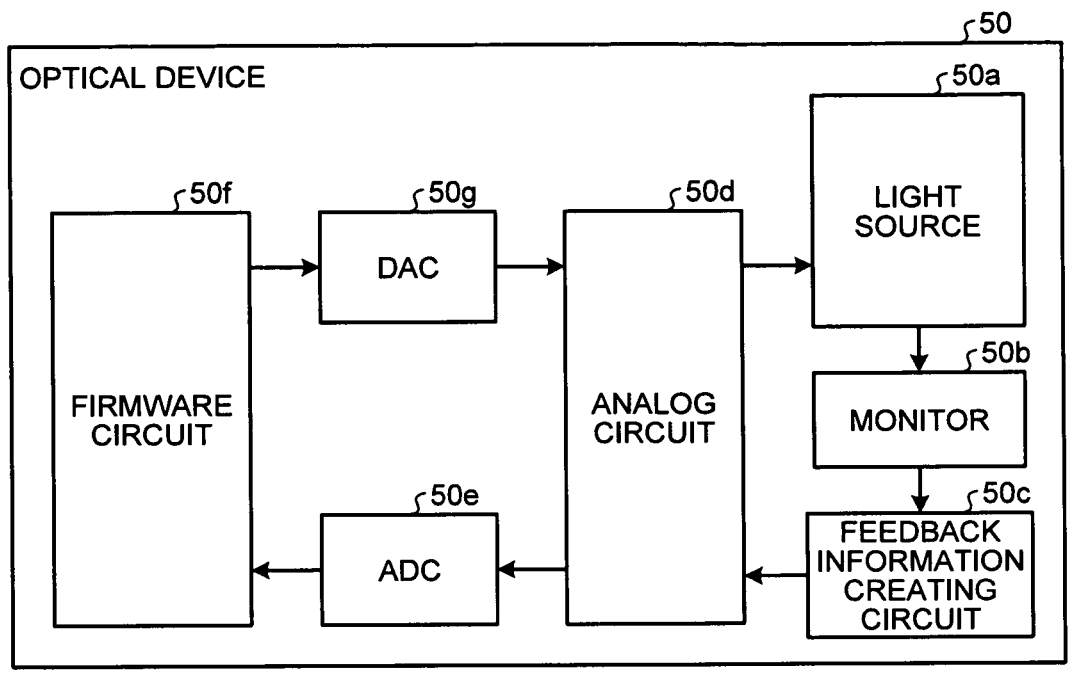
FIG. 20 is a schematic diagram illustrating feedback control.
Figure 21:
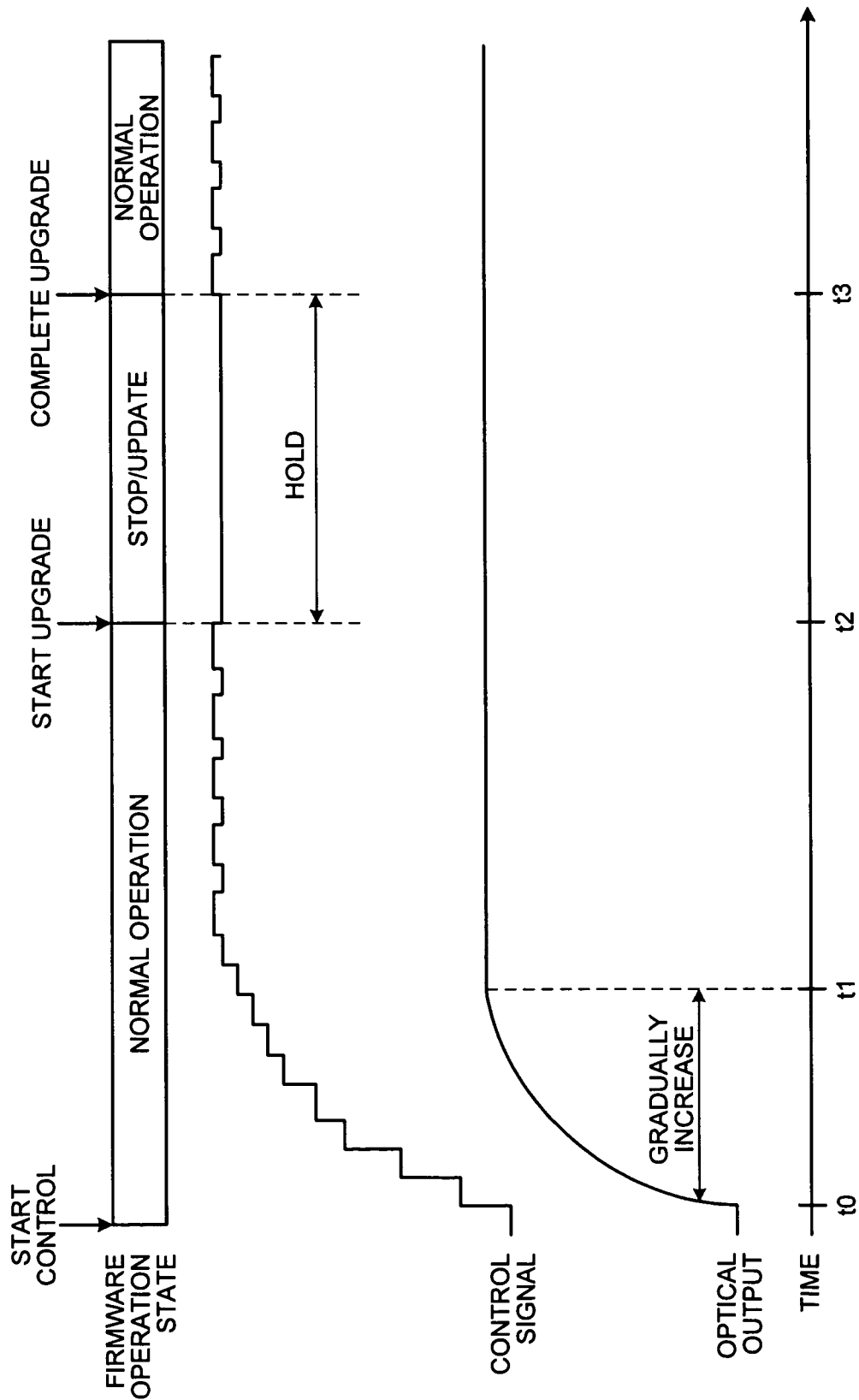
FIG. 21 is a schematic diagram illustrating control performed by the optical device at the time of an upgrade.
Figure 22:
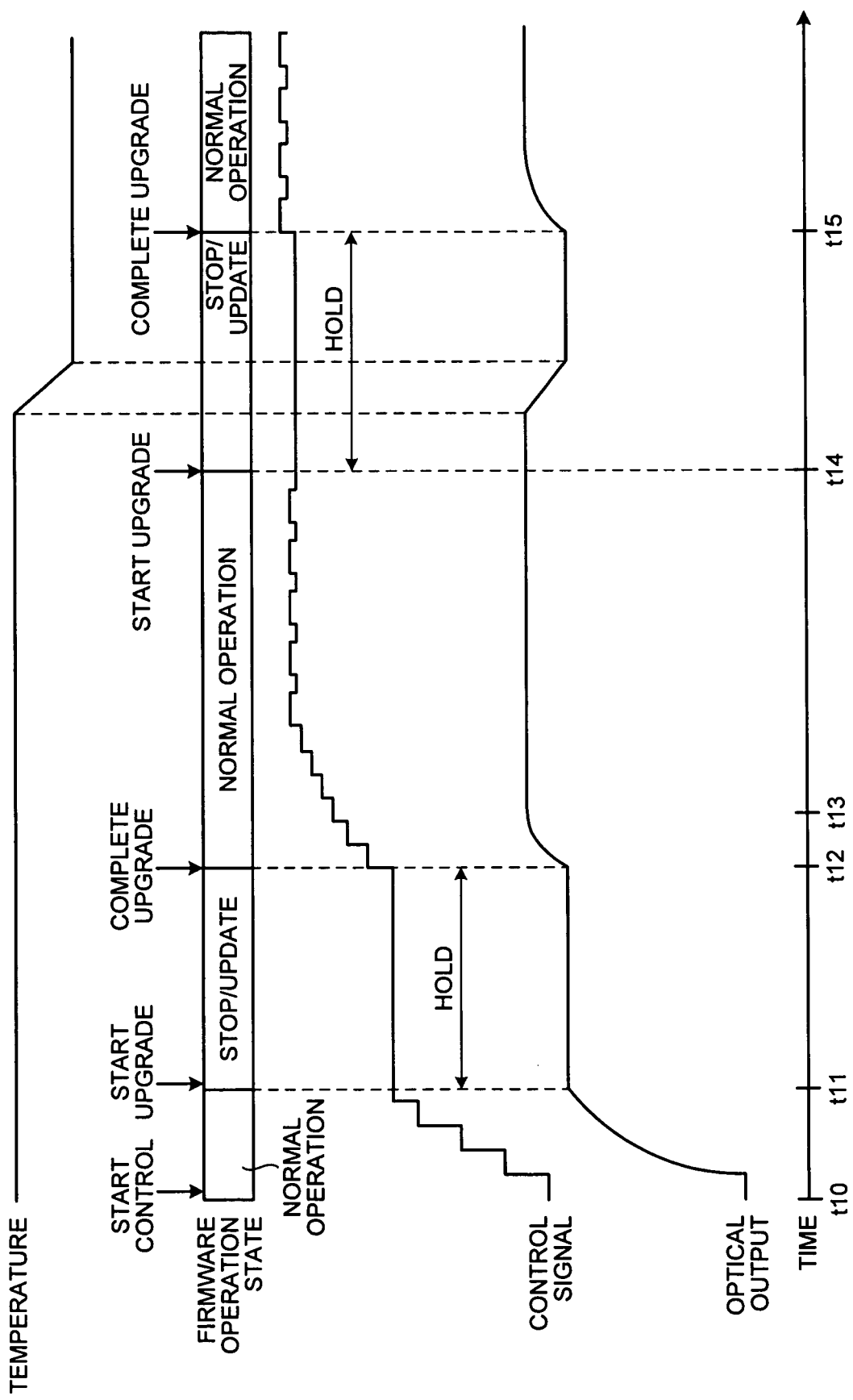
FIG. 22 is a schematic diagram illustrating the state of an optical output at the time of an upgrade.

This will be specifically described with reference to a drawing. FIG. 19 is a schematic diagram illustrating an example case in which firmware is stored in different storage areas. It is assumed that a process performed by a firmware circuit 51 illustrated in FIG. 19 corresponds to that performed by the firmware circuits described in the first to fourth embodiments.

Furthermore, a program memory means a region in which firmware is stored and corresponds to, for example, the memory 106*a* described in the first embodiment.

The firmware circuit 51 illustrated in FIG. 19 includes a processor 51*a*, a program memory 51*b*, and a program memory 51*c*. For example, in normal operation, feedback control is performed in accordance with firmware stored in the program memory 51*b*.

The program memory 51*c* is used as a standby area and stores therein the same firmware as that included in the program memory 51*b*. When the upgrade of the firmware included in the program memory 51*b* is started, first, the processor 51*a* writes new firmware in the standby area (Operation S1).

Then, after the completion of the writing in the standby area, the processor 51*a* switches, as firmware that executes the feedback control, firmware from the firmware stored in the program memory 51*b* to the firmware stored in the program memory 51*c* (Operation S2).

In this way, the firmware circuit 51 upgrades the firmware without suspending the feedback control. However, it is difficult to arrange additional program memory for upgrading the firmware because reductions in size and manufacturing costs are desirable for an optical device.

As described above, according to the optical device described in the embodiments, even when the firmware of the optical device is in the process of being upgraded, it is possible to maintain proper control of the optical output without suspending the control of the optical output.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical device comprising:
   a light source;
   a controller that supplies control information to the light source and controls an output level of the light source; and
   an auxiliary controller that acquires state information of the optical device and records the state information and the control information, and
   when the controller stops supplying the control information, the auxiliary controller outputs the control information to the light source in accordance with a relation between the recorded state information and the recorded control information.

2. The optical device according to claim 1, wherein the auxiliary controller acquires temperature information from the light source, records the control information in a manner associated with the temperature information and outputs control information associated with the temperature information to the light source based on temperature information in a period during which the controller stops supplying the control information.

3. The optical device according to claim 1, wherein the auxiliary controller acquires time information indicating an elapsed time from a rising of an optical output, records the control information in a manner associated with the time information and outputs control information associated with the time information to the light source based on time information in a period during which the controller stops supplying the control information.

4. The optical device according to claim 1, wherein the auxiliary controller acquires temperature information and time information that indicates an elapsed time from a rising of an optical output, records the control information in a manner associated with one of the temperature information and the time information and outputs control information associated with the one of the temperature information and the time information to the light source based on the one of the temperature information and the time information in a period during which the controller stops supplying the control information.

* * * * *

UNITED STATES PATENT AND TRADEMARK OFFICE
CERTIFICATE OF CORRECTION

PATENT NO. : 8,588,622 B2  
APPLICATION NO. : 13/137982  
DATED : November 19, 2013  
INVENTOR(S) : Shuichi Yasuda Page 1 of 1

It is certified that error appears in the above-identified patent and that said Letters Patent is hereby corrected as shown below:

Title Page, Item (75) (Inventor), Line 1, Delete "Shiyuuichi" and insert -- Shuichi --, therefor.

Signed and Sealed this
Twenty-fifth Day of March, 2014

Michelle K. Lee
*Deputy Director of the United States Patent and Trademark Office*